United States Patent [19]

Prokai et al.

[11] 4,043,951

[45] Aug. 23, 1977

[54] ACRYLONITRILE-CAPPED POLYETHER-SILOXANE

[75] Inventors: Bela Prokai, Mahopac; Bernard Kanner, West Nyack, both of N.Y.

[73] Assignee: Union Carbide Corporation, New York, N.Y.

[21] Appl. No.: 627,251

[22] Filed: Oct. 30, 1975

[51] Int. Cl.$^2$ .................................................. C08J 9/00
[52] U.S. Cl. ......................... 260/2.5 AH; 260/448.2 N
[58] Field of Search ................... 260/2.5 AH, 448.2 N

[56] References Cited

U.S. PATENT DOCUMENTS

| | | |
|---|---|---|
| 3,966,784 | 6/1976 | Prokai ...................... 260/2.5 AH X |
| 3,979,419 | 9/1976 | Prokai et al. .............. 260/2.5 AH X |
| 3,979,420 | 9/1976 | Prokai et al. .............. 260/2.5 AH X |

*Primary Examiner*—Lewis T. Jacobs
*Attorney, Agent, or Firm*—Reynold J. Finnegan

[57] ABSTRACT

Acrylonitrile-capped polyoxyalkylene compounds; siloxane polymers modified with the corresponding radicals of said compounds; solvent compositions containing said siloxane polymers; a process for producing polyurethane foam using said siloxane polymers as the foam stabilizer; and the foam produced from said process.

37 Claims, No Drawings

ACRYLONITRILE-CAPPED POLYETHER-SILOXANE

BACKGROUND OF THE INVENTION

The present invention relates to a particular novel class of acrylonitrile-capped polyoxyalkylene compounds and to acrylonitrile-capped polyoxyalkylene-polysiloxane polymers, as well as to the use of said polymers in the formation of cellular urethane products, particularly flexible polyester urethane foam containing a flame-retardant.

It is well known that the urethane linkages of cellular urethanes are formed by the exothermic reaction of a polyfunctional isocyanate and a polyfunctional active hydrogen-containing compound in the presence of a catalyst, and that the cellular structure is provided by gas evolution and expansion during the urethane-forming reaction. Illustrative of suitable active hydrogen-containing compounds are polyester polyols and polyester polyols. In accordance with the "one-shot" process which is the most widely used industial technique, direct reaction is effected between all of the raw materials which include the polyisocyanate, the active hydrogen-containing compound, the catalyst system, blowing agent and surfactant. A major function of the surfactant is to stabilize the urethane foam, that is, prevent collapse of the foam until the foamed product has developed sufficient gel strength to become self-supporting. Among the various types of silicon-containing compositions reported in the literature as effective stabilizers of urethane foam derived from a polyester polyol and a polyether polyol are e.g. those described in U.S. Pat. No. 3,594,334 and U.S. Pat. No. 27,541, respectively. Other patents relating to the manufacture of flexible polyester urethane foam include U.S. Pat. Nos. 3,563,924; 3,793,360; 3,796,676 and 3,833,512.

In recent years considerable effect has been expended and continues, to reduce the recognized objectionable characteristics of urethane polymers in their ability to ignite readily and burn with an open flame. One approach to this problem is to include flame-retarding agent such as various phosphrus and/or halogen-containing compounds as a component of the foam-producing reaction mixture, and in this respect, to develop improved and more efficient flame-retarding agents. As associated problem is to provide surfactants which not only function to stabilize foam containing a flame-retarded but which also allow for the formation of such foam which burns at a reduced rate relative to surfactants designed for stabilization of non-flame-retarded foam. For example, certain siloxane surfactants which are excellent stabilizers of non-flame-retarded foam and which are also capable of stabilizing foam containing a flame-retardant appear to have an adverse effect on the efficiency of the flame retarding agent as seen from the flamability properties of some resulting flexible polyester urethane foam products.

It is desirable, therefore, and is an object of this invention to provide a new class of acrylonitrile-capped polyoxyalkylene compounds as well as a new class of acrylonitrile-capped polyoxyalkylene-polysiloxane polymers which polymers, in addition to the ability to stablize non flame-retarded cellular urethanes, offer particular utility as stabilizers of flexible polyester urethane foam having a flame-retardant incorporated therein.

Various other objects and advantages of this invention will become apparent to those skilled in the art from the accompanying description and the disclosure.

SUMMARY OF THE INVENTION

In accordance with one aspect of the present invention acrylonitrile-capped polyoxyalkylene compounds are provided which can be used to produce the acrylonitrile-capped polyoxyalkylene-polysiloxane polymers employed in this invention.

Illustrative of the novel class of acrylonitrile-capped polyoxyalkylene compounds of this invention are those having the average formula

wherein X is a bridging group selected from the class consiting of —CO— and —NHCO—; wherein R' represents a monovalent olefinic alkylene radical containing from 2 to 6 carbon atoms and usually not more than 4, allyl being preferred; wherein $q$ has a value of 0 or 1; preferably 0; wherein $m$ has a value of from 4 to 30, preferably 4 to 15; wherein $n$ has the value of from 0 to 10, preferably 0, and wherein the sum of $m + n$ has a value of from 4 to 40, preferably 4 to 15.

Another aspect of this invention provides acrylonitrile-capped polyoxyalkylene-polysiloxane polymers, said polymers containing at least one silicon-bonded acrylonitrile-capped polyoxyalkylene radical (Q) wherein Q has the average formula

wherein X, $q$, $n$ and $m$ are the same as defined above and R" represents an alkylene radical, free from unsaturation, and containing from 2 to 6 carbon atoms, usually not more than 4. The preferred alkylene radical R" being propylene. Of course, it is obvious that said alkylene radical R" is derived from and corresponds to the particular R' group of the above defined acrylonitrile-capped polyoxyalkylene compounds used in the production of the novel siloxane polymers of this invention and it is of course also understod that said alkylene radical R" is directly bonded to a silicon atom which constitutes one of the siloxy units of said acrylonitrile-capped polyoxyalkylene-polysiloxane polymers of this invention. It is of course also understood that the other siloxy units as well as other radicals attached thereto that make up the siloxane polymers of this invention are well known in the art and obviously can correspond to those siloxy units and radicals heretofore contained in conventional siloxane surfactants that may be employed as stabilizers in the production of urethane foam and therefore are not critical to the generic definition of the siloxane polymers of this invention.

Illustrative of a preferred class of siloxane polymers of this invention are acrylonitrile-capped polyoxyalkylene polymers consisting essentially of chemically combined (1) monofunctional siloxy units (M°) and (2) an average of from about 0.5 to about 70 moles of difunctional siloxy units (D°) for every 2 moles of M°, with the proviso that an average of at least about 0.5 up to about 30 moles of acrylonitrile-capped polyoxyalkylene groups (Q) are present in said acrylonitrile-capped polyoxyalkylene-polysiloxane polymers for every 2 moles of M°, wherein Q is the same as defined above.

In the monofunctional siloxy units encompassed by M° of said polymers the respective silicon atoms are bonded to two monovalent hydrocarbon radicals (R), preferably alkyl group, the third silicon-bonded group being the aforesaid acrylonitrile-capped polyoxyalkylene group (Q), a monovalent hydrocarbon group (R) or E° a radical selected from the class consisting of a cyano-containing group (E) of the formula —(O)ₓR²CN wherein r is 0 or 1, preferably 0 and R² is an alkylene radical having from 2 to 12 carbon atoms preferably 2 to 4, a cyano-containing group (E¹) of the formula —(O)ₓR²OR²CN wherein r and R² are the same as defined above; a sulfolanyloxyalkyl-containing group (E²) of the formula

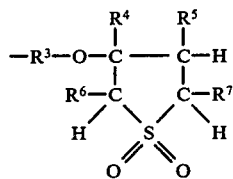

wherein $R^3$ is an alkylene radical having from 2 to 8 carbon atoms and $R^4$, $R^5$, $R^6$ and $R^7$ shown bonded to the carbon atoms in the two to five positions of the ring, respectively, are independently hydrogen and alkyl having from 1 to 4 carbon atoms, and a morpholino-containing group (E³) of the formula

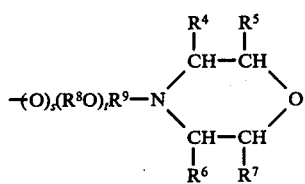

wherein $t$ is 0 or has an average value from about 1 to about 4; $s$ 0 or 1 provided $s$ is 1 when $t$ has a value of more than 1; $R^8$ is an alkylene radical having from 2 to 4 carbon atoms, $R^9$ is an alkylene radical having from 2 to 6 carbon atoms and $R^4$, $R^5$, $R^6$ and $R^7$ are the same as defined above. Thus, included with the scope of M° are monofunctional siloxy units having the following unit formulae which for brevity are also individually referred to herein as the M, $M^1$, $M^2$, $M^3$, $M^4$, and $M^5$ units as shown:

$M = R_3SiO1/2$ $M^1 = (Q)R_2SiO1/2$ $M^2 = (E)R_2^2SiO1/2$ $M^3 = (E^1)R_2SiO1/2$ $M^4 = (E^2)R_2SiO1/2$ $M^5 = (E^3)R_2SiO1/2$

Of course in any given polymer composition the M° units may be the same as or different from one another. In the difunctional units emcompassed by D°, at least one of the two groups bonded to the respective silicon atoms is a monovalent hydrocarbon radical (R), preferably alkyl, and the second silicon-bonded group is Q, E° or R. Thus, included within the scope of D° are difunctional units having the following unit formulae which for brevity, are also individually referred to herein as the D, $D^1$, $D^2$, $D^3$, $D^4$ and $D^5$ units are shown $D = R_2SiO2/2$ $D^1 = (Q)(R)SiO2/2$ $D^2 = (E)RSiO2/2$ $D^3 = (E^1)RSiO2/2$ $D^4 = (E^2)RSiO2/2$ $D^5 = (E^3)RSiO2/2$ Thus, said preferred class of the polymers may contain any combination or subcombination of the respective siloxy units within the scope of M° and D° provided the average composition contains from about 0.5 to about 70 moles of D° for every 2 mols of M° and from about 0.5 to about 30 moles of Q for every 2 moles of M°.

Consistent with the above definition and from the standpoint of the nature and relative proportion of monomeric siloxy units, the above preferred class of acrylonitrile-capped polyoxyalkylene-polysiloxane polymers have the following average composition, as expressed on the normalized basis of a total of two moles of monofunctional units (M°), that is, per average mole of polymer:

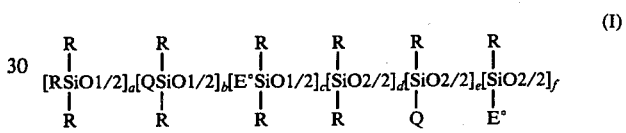

(I)

wherein R, Q and E° are the same as defined above, wherein $a$, $b$, and $c$ are 0 or any positive number having an average value of no more than 2, and the average value of the sum $a+b+c$ is 2; wherein $d$ is 0 or any positive number having an average value of up to about 20, $e$ is 0 or any positive number having an average value of up to about 30, and $f$ is 0 or any positive number having an average value up to about 20, provided that average value of the sum $b+e$ is at least about 0.5 up to about 30.

It is evident, therefore, that the sum $b+e$ corresponds to the total number of Q groups contained in an average mole of polymer and that when either $b$ or $e$ is 0, the other must be at least 0.5. It is also evident that when any combination of $a$, $b$ and $c$ are positive numbers the polymers contain said combination of respective monofunctional units.

Another prepared class of acrylonitrile-capped polyoxyalkylene-polysiloxane polymers are those polymers consisting essentially of silicon-containing units A, B and C wherein A is SiO4/2, B is a polyfunctional siloxy unit in which silicon is bonded to at least one acrylonitrile-capped polyoxylakylene group (Q) as defined above, and C is a monofunctional triorganosiloxy unit, and in which there are from about 0.4 about 2 moles of A, and from about 0.2 to about 2 moles of C, per mole of B.

Yet another class of acrylonitrile-capped polyoxyalkylene-polysiloxane polymers are those polymers consisting essentially of silicon-containing units, A', B' and C', wherein A' is SiO4/2, B' is a mono-functional siloxy unit in which silicon is bonded to at least one acrylonitrile-capped polyoxyalkylene group (Q) as defined above, and C' is a monofuctional trihydrocarbylsiloxy unit, and which there are from about 0.75 to about 2 moles of A', and from about 0.1 to about 1 mole of C', per mole of B'.

In accordance with another aspect of the present invention, there is provided a process for producing polyurethane foam which comprises reacting and foaming a reaction mixture of: (a) an organic polyol reactant comprising a polyether polyol or a polyester polyol containing an average of at least two hydroxyl groups per molecule; (b) a polyisocyanate reactant containing at least two isocyanato groups per molecule; (c) a blowing agent; (d) a catalyst comprising a tertiary-amine; and (e) a foam stabilizing component comprising the acrylonitrile-capped polyoxyalkylene-polysiloxane polymers of the present invention. In addition to their efficacy as stabilizers of non-flame retardant urethane foam, it has been found that certain polymers described herein possess the further advantageous property of allowing for the formation of flame-retardant containing flexible polyester foam of acceptable overall quality, and reduced combustibility relative to unmodified polyalkylsiloxane-polyoxyalkylene copolymers. In accordance with this aspect of the present invention, flame-retardant containing flexible polyester-based urethane foam products are provided by reacting and foaming respective reaction mixtures which additionally include a flame-retarding agent.

In providing the polyurethane foams of the invention, the acrylonitrile-capped polyoxyalkylene-polysiloxane polymers can be introduced to the foam producing reaction mixture either as such, as a blend with various organic additives including organic surfactants or in combination with one or more of the polyol reactant, blowing agent, amine catalyst and, when used, the flame-retarding agent.

DESCRIPTION OF THE PREFERRED EMBODIMENT

The acrylonitrile-capped polyoxyalkylene compounds of this invention which are used as reactants to produce the acrylonitrile-capped polyoxyalkylene-polysiloxane polymers of this invention can be made by the cyanoethylation reaction of olefinic-started and hydroxyl and endblocked polyoxyalkylene compounds.

The olefinic and hydroxyl endblocked polyoxyalkylene compounds and/or methods for their preparation as well known in the art. For instance by reacting an alkenol, R'OH, an olefinic carboxylic acid R'COOH or an olefinic R'NHCOOH wherein R' is the same as defined above with ethylene oxide or a mixture of ethylene oxide and 1,2-propylene oxide in the presence of a base catalyst, e.g. KOH the corresponding olefinic and hydroxyl endblocked polyoxyalkylene compound having the formula $$R'(X)_q(OC_3H_6)_n(OC_2H_4)_mOH$$

can be produced wherein R', X, q, n and m are the same as defined above. Illustrative examples of such hydroxyl starters are $H_2C=CHOH$, $H_2C=CH-CH_2OH$, $H_2C=C(CH_3)-CH_2OH$, $H_2C=CH-CH_2COOH$, $H_2C=CH-CH_2NHCOOH$, and the like. Of course it is understood that when the polyoxyalkylene compound contains both oxyethylene and oxypropylene units that such oxyalkylene units can be randomly distributed throughout the chain such as when a mixture of the alkylene oxides is polymerized or they can be arranged as sub-blocks in any desired fashion such as when the respective alkylene oxides are polymerized sequentially.

Conventional cyanoethylation of such olefinic started and hydroxyl endblocked polyoxyalkylenes in the presence of a base catalyst then produces the corresponding arcylonitrile-capped (i.e. beta-substituted propionitrile) polyoxyalkylene compounds of this invention as illustrated by the following equation $$R'(X)_q(OC_3H_6)_n(OC_2H_4)_mOH + CH_2=CHCN \xrightarrow{Base}$$
$$R'(X)_q(OC_3H_6)_n(OC_2H_4)_mOCH_2CH_2CN$$

wherein R', X, q n and m are the same as defined above. As pointed out above preferably R' is allyl, q is 0, n is 0 and m is 4 to 15. Thus, the most preferred acrylonitrile capped polyoxyalkylene compounds are those having the average formula $$CH_2=CHCH_2(OC_2H_4)_mOCH_2CH_2CN$$

wherein m is 4 to 15 which compounds are derived from the cyanoethylation of an allyl alcohol started and hydroxy end blocked polyoxyethylene. High conversions of said acrylonitrile-capped polyoxyalkylene compounds are readily achieved by using essentially stoichiometric amounts of acrylonitrile and $(CH_3)_4NOH$ or NaOH base catalysts. The cyanoethylation rate of about 10° C. to about 20° C. is fast and about 90-95 percent complete in less than 2 hours. The use of $(CH_3)_4NOH$ catalyst is prepared over NaOH mainly because of capping efficiency and less acrylonitrile homopolymer formation. As indicated above, the acrylonitrile capped polyoxy-alkylene compounds of this invention are useful reactants in preparing the acrylonitrile capped polyoxyalkylene-polysiloxane polymers of this invention.

The functionality of the respective types of structural units encompassed by $M^o$, $D^o$, A, B, C, and A', B', C', of the siloxane polymers of this invention denotes the number of oxygen atoms to which the silicon atoms (Si) of any particular unit is bonded. Since each oxygen atom is shared by a silicon atom (Si') of another unit, functionality also denotes the number of linkages by which the particular unit can be bonded to another portion of the polymer through —Si—O—Si'—bonds. Accordingly, in expressing the individual formulas of the respective units of the polymers of this invention, fractional subscripts are used in which the values of the numerator defines functionality (i.e., the number of oxygen atoms associated with the silicon atom of the particular unit), and the denominator, which in each instance is 2, denotes that each oxygen atom is shared with another silicon atom. Thus, monofunctional units e.g. $M^o$, are chain terminating or end-blocking units and the respective oxygen atoms thereof are shared with silicon of one anther unit, e.g. $D^o$. On the other hand, $D^o$ units are difunctional and thus the respective two oxygen atoms associated with each silicon atom thereof are shared with respective silicon atoms of other units. Thus, the reoccurring difunctional units may be distributed in the polymer randomly, alternatively, as sub-blocks of repeating units of the same type, or in any combination of such arrangements. Although the siloxane polymers of this invention can be discrete chemical compounds, they are usually mixtures of discrete siloxane species which differ in molecular weight and in the type, arrangement and relative proportions of units. Therefore, as expressed herein, the parameters employed to denote these variables are average values and are based on the relative proportions of reactants from which the various units are derived. It is to to further understood that, consistent with convention in the art to which the present invention pertains, as expressed herein, the formulas of the polymers indicate their overall average emperical composition rather than any particular polymer species.

With this understanding the average composition of some of the more preferred respective types of polymers emcompassed by siloxane polymers of this invention the following formulae wherein the various siloxy units are shown in chemically combined form:

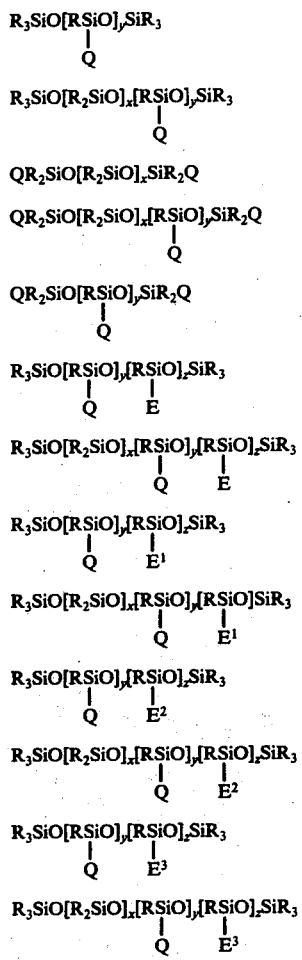

wherein R, Q, E, E¹, E² and E³ are the same as defined above, x has an average value of 0.5 to 20; y has an average value of 0.5 to 30 and z has an average value of 0.5 to 20.

Another illustrated class of siloxane polymers of ths invention are those having the average formula $$[SiO4/2]_g [RSiO2/2]_h [R_3SiO1/2]_i$$
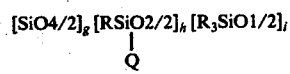

wherein R and Q are the same as defined above and wherein the mole ratio of the SiO4/2 units to total polyfunctional units to total monofunctional units is defined by $g:h:i$ in which the ratio of $g:h$ is from about 0.4:1 to about 2:1, and the ratio of $i:h$ is from about 0.2:1 to about 2:1.

Yet another illustrated class of siloxane polymers of this invention are those having the average formula $$[SiO4/2]_j [RSiO1/2]_k [R_3SiO1/2]_p$$
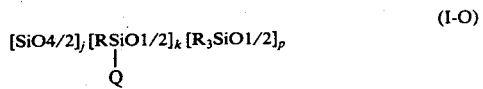

wherein R and Q are the same as defined above and wherein the mole ratio of the SiO4/2 units to total Q substituted siloxy units to total trihydrocarbylisiloxy units is defined by $j:k:p$ in which the ratio of $j:k$ is from about 0.75:1 to about 2:1, and the ratio of $p:k$ is from about 0.1:1 to about 1:1.

The silicone-bonded bonded R groups are monovalent hydrocarbon radicals containing from 1 to about 20 carbon atoms and preferably are alkyl radicals having from one to ten carbon atoms including linear and branched alkyls. Illustrative of suitable groups encompassed by R are methyl, ethyl, n-propyl, isopropyl, n-butyl, t-butyl, pentyl, hexyl, octyl, decyl and the like. Of the various groups represented by R, the lower alkyls (that is, those having from one to four carbon atoms) are more preferred of which methyl is especially suitable. It is to be understood that the R groups may be the same throughout the polymers or that may differ as between or within units departing from the scope of this invention. For example, when the endblocking monofunctional units are M, that is, R₃SiO1/2—, that may be trimethylsiloxy units and the difunctional units, R₂SiO2/2, when present, may be diethylsiloxy and/or methhylethylsiloxy units. The most preferred M and D siloxy units are (CH₃)₃SiO1/2 and (CH₃)₂SiO2/2 respectively.

In the Q substitutents of the siloxane portion of the polymers of this invention, that is in the silicon-bonded acrylonitrile-capped polyoxyalkylene radical.

$$—R''(X)_q(OC_3H_6)_n(OC_2H_4)_mOCH_2CH_2CN$$

R", X, q, n and m are as previously defined. As stated R" represents an alkylene radical including linear and branched radicals of the series $$—C_wH_{2w}—$$

wherein w is an integer having from a value of 2 to 8, preferably not more than 4, such as ethylene, 1,2-propylene, 1,3-propylene, 1-4-butylene and the like. It is also preferred that q and n are 0 and m has a value of 14 and 15 and most preferably R" is a propylene radical. It is also to be understood that the Q groups may be the same throughout the polymers or they may differ as between or within units without departing from the scope of the invention. Likewise, as stated the oxyethylene and oxypropylene units when both are present may be randomly distributed or arranged as sub-blocks in any desired fashion. Illustrative of such preferred M', D' and [RQSiO1/2] siloxy units are (CH₃)₂SiO1/2
  |
  CH₂CH₂CH₂(OC₂H₄)ₘOCH₂CH₂CN
CH₃SiO1/2
  |
  CH₂CH₂CH₂(OC₂H₄)ₘOCH₂CH₂CN

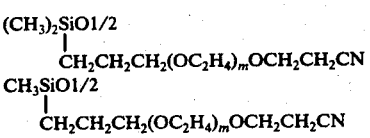

-continued

CH₃SiO2/2
|
CH₂CH₂(OC₃H₆)ₙ(OC₂H₄)ₘOCH₂CH₂CN

CH₃SiO2/2
|
CH₂CH₂NHCO(OC₂H₄)ₘOCH₂CH₂CN

CH₃SiO2/2
|
CH₂CH₂CH₂(OC₃H₆)ₙ(OC₂H₄)ₘOCH₂CH₂CN

CH₃SiO2/2
|
CH₂CH₂CH₂CO(OC₂H₄)ₘOCH₂CH₂CN

CH₃SiO2/2
|
CH₂CHCH₂(OC₂H₄)ₘOCH₂CH₂CN
  |
  CH₃

CH₃SiO2/2
|
CH₂CH₂CH₂(OC₂H₄)ₘOCH₂CH₂CN and the like, wherein $n$ and $m$ are the same as defined above.

In the silicon-bonded, cyano-substituted —(O)ᵣR²CN groups, (group E above), $R^2$ represents an alkylene radical including linear and branched radicals of the series, —$C_wH_{2w}$—, where $w$ has value of from 2 to 12, and is usually no more than 6. Illustrative of suitable groups represented by $R^2$ are: ethylene (—CH₂CH₂—); 1,3-propylene or trimethylene (—CH₂CH₂CH₂—); 1,2-propylene [—CH₂CH(CH₃)—]; and tetramethylene. Most preferably, —$R^2$— is a lower alkylene group having from 1 to 4 carbon atoms. It is to be understood that the —$R^2$— groups may be the same throughout the polymer or may differ and that the polymer may contain any combination of cyanoalkyl (—R²CN) and cyanoalkoxy (—OR²CN) substituted siloxy units. Illustrative of such preferred $M^2$ and $D^2$ siloxy units are (gamma-cyanopropyl)di-methylsiloxy; (beta-cyanoethoxy) methylsiloxy; (beta-cyanoethyl) methylsiloxy; (beta-cyanopropyl) methylsiloxy; (gamma-cyanopropyl) methylsiloxy; (gamma-cyanopropyloxy) methylsiloxy; (gamma-cyanopropyl)ethylsiloxy; (gamma-cyanobutyl) methylsiloxy; (delta-cyanobutyl) methylsiloxy, and the like. The most preferred $D^2$ siloxy unit is (gamma-cyanopropyl) methylsiloxy.

In the silicon-bonded, cyanosubstituted —(O)ᵣR²OR²CN groups, (group E¹ above), $R^2$ and $r$ are the same as defined above. Among the more preferred $E^1$ groups are —(O)ᵣC_uH_{2u}OC_vH_{2v}—CN wherein $r$ is 0 or 1, $u$ has a value of 3 to 8 and $v$ has a value of 2 to 4. It is to be understood that the siloxane polymer may contain any combination of cyanoalkoxyalkyl (—R²OR²CN) and/or cyanoalkoxyalkoxy (OR²OR²CN) substituted siloxy units. Illustrative of such preferred $M^3$ and $D^3$ siloxy units are 3-(2-cyanoethyoxy)propyl methylsiloxy; 3-(3-cyanopropoxy)propyl methylsiloxy; 3-(2-cyanoethoxy) propoxy methylsiloxy; 3-(2-cyanoethoxy)propyl ethylsiloxy; 3-(2-cyanoethyl)-2-methylpropyl methylsiloxy; 8-(2-cyanoethyoxy)octyl methylsiloxy; 3-(2-cyano-2-methylethoxy)propyl methylsiloxy; 3-(2-cyano-2-ethylethoxy)propyl methylsiloxy; 3-(2-cyanoethoxy)propyl dimethylsiloxy; 3-(2-cyanoethoxy)propoxy dimethylsiloxy; 3-(2-cyanoethoxy)propyl diethylsiloxy; 3-(2-cyanoethoxy)propyl methylethylsiloxy; and the like. The most preferred $D^3$ siloxy unit is 3-(2-cyanoethoxy) propyl methylsiloxy.

In the silicon-bonded, sulfoanyloxyalkyl groups

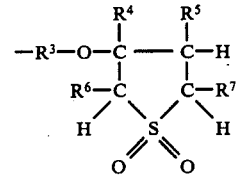

(group E² above) the $R^4$ through $R^7$ groups are, as previously defined, hydrogen or $C_1$ to $C_4$ alkyls. Usually, no more than two are alkyls as in the 2,4-dimethylsulfolan-3-yloxyalkyl nucleus. Preferably each of $R^4$, $R^5$, $R^6$ and $R^7$ is hydrogen. The $R^3$ group is an alkylene radical including linear and branched radicals, of the series, —$C_wH_{2w}$—, wherein $w$ is an integer having a value from 2 to 8. Illustrative of the linear and branched saturated alkylene radicals encompassed by —R3— are ethylene, 1,3-propylene or trimethylene; 1,2-propylene; 2-methyl-1,3-propylene 1-methyl-1,3-propylene; 1-ethyl-ethylene; 1-4-butylene or tetramethylene; 3-methyl-1, 3-propylene; 3-ethyl-1, 3-propylene; 1,5-pentylene or pentamethylene; 4-methyl-1, 4-butylene; 1,6-hexylene or hexamethylene; 1-methyl-3, 3-dimethyl-1, 3-propylene; 1-ethyl-2, 2-dimethyl-ethylene; 4,4-dimethyl-1, 4-butylene; 3-propyl-1, 3-propylene; 1-ethyl-1; 4-butylene; 1-propyl-1, 3-propylene; 1,8-octylene or octamethylene; and the like. Preferably, —$R^3$— has from 2 to 6 carbon atoms and most preferably has 3 or 4 carbon atoms.

Illustrative of such preferred $M^4$ and $D^4$ siloxy units are

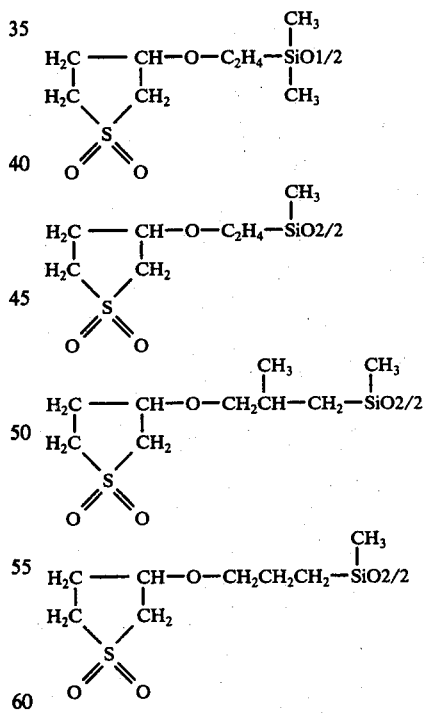

and the like. The most preferred $D^4$ siloxy unit being one wherein $R^4$ through $R^5$ are hydrogen, R is methyl and $R^3$ is propyl. It is to be also understood that the siloxane polymers of this invention may contain any one of the various types of $M^4$ and $D^4$ siloxy units illustrated above or any combination thereof.

In the silicon-bonded morpholino groups

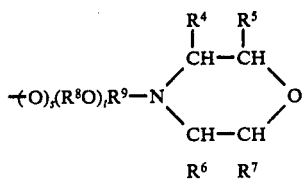

(group E³ above) the R⁴ through R⁷ groups are, as previously defined, hydrogen or C₁ to C₄ alkyls. Usually, no more than two are alkyls as in the 2,6-dimethylmorpholino nucleus. Preferably, each of R⁴, R⁵, R⁶ and R⁷ is hydrogen. The R⁸ and R⁹ groups are alkylene radicals, of the series, —C$_u$H$_{2u}$— and —C$_v$H$_{2v}$—, respectively, where $u$ is an integer having a value from 2 to 4 (R⁸) and $v$ is an integer having a value from 2 to 6 (R⁹). Illustrative of the linear and branched bivalent alkylene radicals encompassed by R⁸ and R⁹ are: ethylene; 1,3-propylene; 1,2-propylene; 1,4-butylene; 1,2-butylene; 2,3-butylene; and, in addition R⁹ can be 1,5-pentylene, 1,2-pentylene, 1,6-hexylene and the like. Preferably, —R⁸— has from 2 to 3, and R⁹ has from 2 to 4, carbon atoms. It is to be understood that when $t$ of the morpholino-bearing group has an average value from about 1 to about 4, —(R⁸O)$_t$— may be ethyleneoxy, poly(ethyleneoxy), propyleneoxy, poly(propyleneoxy), or a combination of different alkyleneoxy units.

Illustrative of such preferred M⁵ and D⁵ siloxy units are

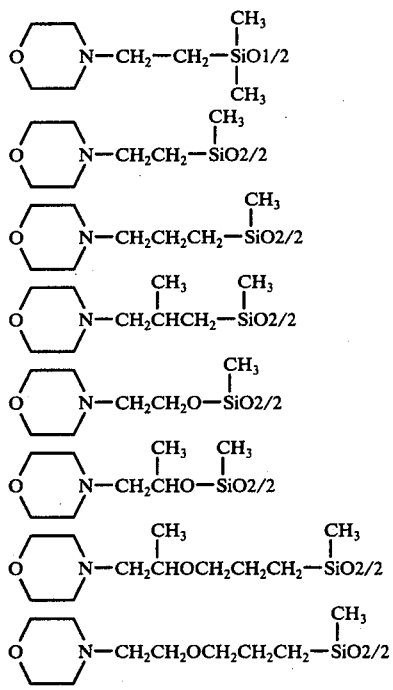

and the like. The most preferred D⁵ siloxy unit being one wherein R⁴ through R⁷ are hydrogen, R is methyl, R⁹ is propylene, and $s$ and $t$ are 0. It is to be understood that the siloxane polymers of this invention may contain any one of the various types of M⁵ and D⁵ siloxy units illustrated above or any combination thereof.

Of the preferred acrylonitrile-capped polyoxyalkylene polysiloxane polymers of this invention having utility as stabilizers of flexible polyester polyol-based urethane produced with a flame retardant are those with the scope of Formula (I-B), and (I-G) wherein R is a methyl radical; $x$ has an average value of about 0.5 to about preferably 1 to about 10; $y$ has an average value of about 0.5 to about 30 preferably about 1 to about 10; $z$ has an average value of about 0.5 to about 20, preferably about 1 to about 10; and the acrylonitrile-capped polyoxyalkylene radical (Q), is preferably —CH₂CH₂CH₂(OC₃H₆)$_n$(OC₂H₄)$_m$OCH₂CH₂CN wherein $n$ has an average value of 0 to 10, preferably 0 and $m$ has an average value of from about 4 to about 30, preferably about 4 to 15; and the cyano-containing group (E), is preferably

—R²CN wherein R² is an alkylene radical having from 2 to 4 carbon atoms, preferably propylene.

The most preferred of all of the acrylonitrile-capped polyoxyalkylene-polysiloxane polymers of this invention are those having the average formula (CH₃)₃SiO[(CH₃)₂SiO]$_x$[CH₃SiO]$_y$Si(CH₃)₃
|
CH₂CH₂CH₂(OC₂H₄)$_m$OCH₂CH₂CN wherein $x$ and $y$ have a value of about 1 to about 10 and $m$ has a value of about 4 to about 15.

The acrylonitrile-capped polyoxyalkylene-polysiloxane polymers of this invention are prepared by the platinum catalyzed hydrosilation of the acrylonitrile-capped polyoxyalkylene compounds of this invention as defined above with silicon-hydrogen containing siloxane starting materials as illustrated e.g. by the following equation $$[RSiO1/2]_a[HSiO1/2]_b[E°SiO1/2]_c[\overset{R}{\underset{R}{Si}}O2/2]_d[\overset{R}{\underset{H}{Si}}O2/2]_e[\overset{R}{\underset{E°}{Si}}O2/2]_f$$

(Formula II)

+ R'(X)$_q$(OC₃H₆)$_n$(OC₂H₄)$_m$OCH₂CH₂CN ⟶

$$[RSiO1/2]_a[QSiO1/2]_b[E°SiO1/2]_c[\overset{R}{\underset{R}{Si}}O2/2]_d[\overset{R}{\underset{Q}{Si}}O2/2]_e[\overset{R}{\underset{E°}{Si}}O2/2]_f$$

(Formula I)

In which R, R', E°, $a, b, c, d, e, f, n, m$ and $q$ are the same as defined above.

More particularly, by way of example, the most preferred acrylonitrile-capped polyoxyalkylene-polysiloxane compounds of Formula I-A above may be illustrated by the following equation (CH₃)₃SiO[(CH₃)₂SiO]$_x$[CH₃SiO]$_y$Si(CH₃)₃
|
H + H₂C = CHCH₂(OC₂H₄)$_m$OCH₂CH₂CN ⟶

(CH₃)₃SiO[(CH₃)₂SiO]$_x$[CH₃SiO]$_y$Si(CH₃)₃
|
CH₂CH₂CH₂(OC₂H₄)$_m$OCH₂CH₂CN wherein $x$ and $y$ have a value of about 1 to 10 and $m$ has a value of about 4 to 15.

This general hydrosilation reaction it conventional and well known in the art. Particularly effective is platinum in the form of chloroplatinic acid dissolved if desired, in a solvent such as tetrahydrofuran, ethanol, butanol, 1,2-dimethoxyethane or mixed solvents such as ethanol/1,2-dimethoxyethane, It is to be understood, however, that other platinum derivatives known to the art as hydrosilation catalysts may also be used. For example, also suitable as promoters of the hydrosilation reaction are the platinum catalysts prepared by reaction of chloroplatinic acid and an alcohol such as octanol as described in U.S. Pat. No. 3,220,972. The platinum is present in a catalytic amount such as, for example, from about 5 to about 400 parts by weight per million (p.p.m.) parts of the combined weight of the silicon-containing and organic reactants. The more usual platinum concentration is no more than about 200 p.p.m. preferably 5 to 50 p.p.m. The preferred temperature range for the reaction is 60° to 138° C. Lower temperatures may be used but the reaction times are slower. Higher temperatures may also be used up to 200° C. In carrying out the process to prepare the siloxane polymers of this invention it is generally preferred to mix all the ingredients, except the platinum catalyst, at about 25° C. and allow the mixture to warm up to 80° C. (with external heating) At this temperature the platinum catalyst is added and usually an exothermic reaction is observed. The hydrosilation reaction may be conducted in the absence or presence of a solvent. Of course, solvents which themselves are reactive with SiH under the conditions of this invention should not be employed. Illustrative solvents are normally liquid aromatic hydrocarbons such as benzene, toluene and xylene; alcohols such as methanol, ethanol, n-propanol, isopropanol; ethers; ether alcohols; and the like. The solvents may be used individually or in combination with one another. Upon completion of the reaction, excess reactant and any organic solvent employed in the polymer preparation, may be removed by conventional separation techniques to obtain the final product comprising the polymer compositions of the invention. It is to be understood, however, that some portion or all of the solvent and excess reactants including by-products thereof and the polyether reactant may remain in the product and that such diluted polymer compositions are within the scope and may be used in accordance with the teachings of this invention. In the hydrosilation reaction, the removal or neutralization of the platinum catalyst is usually desirable for long range product stability. Neutralization is readily effected by adding sodium bicarbonate to the reaction mixture followed by filtration of the resultant slurry to remove the neutralizing agent and platinum residues. The hydrosilation reaction comprising the addition of Si—H to the respective acrylonitrile-capped polyoxyalkylene compounds of this invention is carried out by employing said respective acrylonitrile-capped polyoxyalkylene compounds in an amount at least sufficient to react with a predetermined proportion of the silicon-bonded hydrogen of the SiH reactant. From the standpoint of more effective and more complete reaction of silanic hydrogen the acrylonitrile-capped polyoxyalkylene compounds are usually employed in excess of stoichiometric requirements e.g. the acrylonitrile-capped polyoxyalkylene compounds may be employed in amounts up to a 100 or more mole percent excess.

The silicon-hydrogen containing siloxanes used as starting materials in the hydrosilation reaction of this invention and/or methods for their preparation are well known in the art. For example, such siloxane starting materials can be produced by cohydrolyzing and condensing the appropriate hydrolyzable silanes or by equilibrating appropriate siloxanes using conventional techniques. Obviously the particular siloxane starting material used in a given hydrosilation process will correspond to and merely depend upon the particular type of acrylonitrile-capped polyoxyalkylene-polysiloxane product desired.

For instance the siloxane products of Formulas (I-A), (I-B), (I-C), (I-D) and (I-E) above can be produced by reacting the above-defined acrylonitrile-capped polyoxyalkylene compounds of this invention with the following silicon-hydrogen containing starting materials, respectively

(II-A)

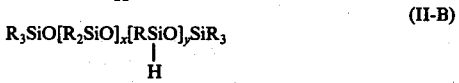
(II-B)

(II-C)

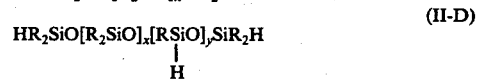
(II-D)

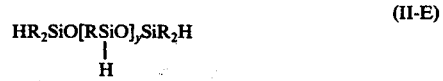
(II-E)

wherein R, $x$ and $y$ are the same as defined above. Such starting materials are well known in the art.

The siloxane products of Formulas (I-F) and (I-G) above can be produced by reacting the above defined acrylonitrile-capped polyoxyalkylene compounds of this invention with the following silicon-hydrogen containing siloxane starting materials, respectively

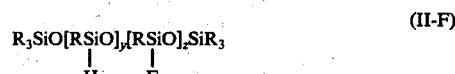
(II-F)

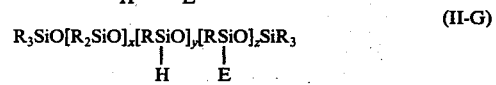
(II-G)

wherein R, E, $x$, $y$ and $z$ are the same as defined above. Such starting materials as well as others may be produced, e.g., as disclosed in U.S. Patent Application Ser. No. 457,510 filed Apr. 3, 1974, now U.S. Pat. No. 3,954,824.

The siloxane products of Formulas (I-H) and (I-I) above can be produced by reacting the above defined acrylonitrile-capped polyoxyalkylene compounds of this invention with the following silicon-hydrogen containing siloxane starting materials, respectively,

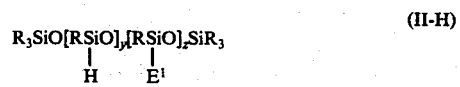
(II-H)

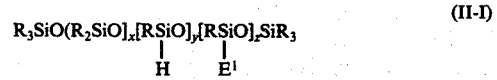
(II-I)

wherein R, E¹, x, y and z are the same as defined above. Such starting materials as well as others may be produced e.g., as disclosed in U.S. Patent Appliction Ser. Nos. 536,874 and 536,884 both filed Dec. 27, 1974, now U.S. Pats. Nos. 3,943,156 and 3,979,419 respectively.

The siloxane products of Formulas (I-J) and (I-K) above can be produced by reacting the above defined acrylonitrile-capped polyoxyalkylene compounds of this invention with the following silicon-hydrogen containing siloxane starting materials, respectively,

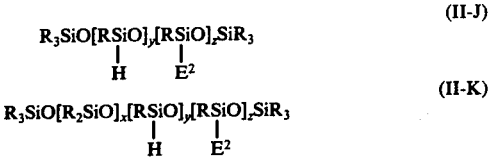

wherein R, E², x y and z are the same as defined above. Such starting materials as well as others may be produced e.g., as disclosed in U.S. patent application Ser. No. 592,129 filed June 30, 1975.

The siloxane products of Formulas (I-L) and (I-M) above can be produced by reacting the above defined acrylonitrile-capped polyoxyalkylene compounds of this invention with the following silicon-hydrogen containing siloxane starting materials, respectively

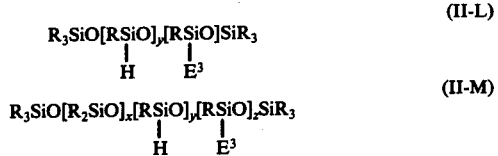

wherein R, E³, x y and z are the same as defined above. Such starting materials as well as others may be produced e.g. as disclosed in U.S. patent application Ser. No. 552,996 filed Feb. 25, 1975, now U.S. Pat. No. 4,018,723.

The siloxane products Formula (I-N) above can be produced by reacting the above defined acrylonitrile-capped polyoxyalkylene compounds of this invention with the following silicon-hydrogen containing siloxane starting materials.

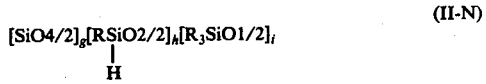

wherein R, g, h and i are the same as defined above. Such starting materials as well as others may be produced e.g., as disclosed in U.S. Pat. Nos. 3,793,360 and 3,833,512.

The siloxane products of Formula (I-O) above can be produced by reacting the above defined acrylonitrile-capped polyoxyalkylene compounds of this invention with the following silicon-hydrogen containing siloxane starting materials.

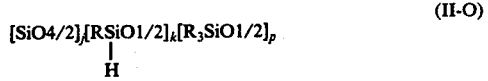

wherein R, j, k and p are the same as defined above. Such starting materials as well as others may be produced e.g. as disclosed in U.S. Pat. No. 3,796,676.

The acrylonitrile-capped polyoxyalkylene-polysiloxane polymers of this invention are normally liquid compositions and as previously described normally comprise mixtures of polymer species which may differ in molecular weight, polyether and siloxane contents and relative number of monomeric units. It is to be understood that two or more polymers or two or more silicon-hydrogen polymers having a particular average composition encompassed by respective Formulas I and II may be admixed in suitable relative proportions to adjust the average values of $x$, $y$ and $z$ as desired. For example, a siloxane polymer wherein $y$ has an average value of about 5 may be admixed with another wherein $y$ has an average value of about 2 to provide a siloxane polymer wherein $y$ has an average value of about 3.5. Similarly a silicon-hydrogen containing siloxane in which no $R_2SiO_{2/2}$ units are present (that is in which $x$ is 0) may be admixed in any relative proportion with another in which $x$ is 1, thereby providing a siloxane in which the average value of $x$ is less than 1 (such as 0.5 etc.) which is then reacted as described herein to provide the acrylonitrile-capped polyoxyalkylene-polysiloxane polymer in which $x$ has a corresponding average value. It is to be also understood that a small percentage (on the average, usually about 15 mole percent or less preferably less than 10 mole percent) of the acrylonitrile-capped polyoxyalkylene blocks of the siloxane polymer may comprise residual, uncapped hydroxyl-terminated groups introduced with the acrylonitrile-capped polyoxyalkylene reactants. Likewise, it is understood that the acrylonitrile-capped polyoxyalkylene-polysiloxane polymers of this invention may be graft or block polymers and that it may be possible for some polymers to contain a small portion of residual unreacted Si—H groups.

The acrylonitrile-capped polyoxyalkylene-polysiloxane polymers of this invention are generally useful as surfactants and find particular application in the manufacture of urethane foam. The normally liquid polymers can be used as such, for stabilization of urethane foam without the need for combination with other surfactants or other type of organic additive. The polymers can be employed as a 100 percent active stream, or they can be employed in dilute form as a solution in polar solvents (e.g., glycols) or non-polar organic solvents such as normally liquid aliphatic and aromatic unsubstituted and halogen-substituted hydrocarbons (e.g., heptane, xylene, toluene, chlorobenzenes and the like).

In addition to the acrylonitrile-capped polyoxyalkylene-polysiloxane polymers of this invention used as foam stabilizers, the other essential types of components and reactants employed in the production of urethane foam in accordance with the process of this invention are an organic polyol comprising a polyether polyol or a polyester polyol, an organic polyisocyanate, an amine catalyst and a blowing agent. The foam-producing reaction mixtures may also contain a flame-retardant. The amount of the acrylonitrile-capped polyoxyalkylene-polysiloxane polymers of this invention present in the final foam-producing reaction mixture may vary over a relatively wide range such as from about 0.1 to about 5 parts by weight per 100 parts by weight of the polyol reactant, and are usually present in an amount of at least about 0.2 and no more than about 3 parts.

In producing polyether polyol-based urethanes one or more polyether polyols is employed for reaction with the polyisocyanate reactant to provide the urethane linkage. Such polyether polyols as well as methods for their manufacture are well known in the art and contain an average of at least two, and usually not more than six, hydroxyl groups per molecule and include compounds which consist of carbon, hydrogen and oxygen and compounds which also contain phosphorus, halogen and/or nitrogen.

Among the suitable polyether polyols that can be employed are the poly(oxyalkylene) polyols, that is, alkylene oxide adducts of water or a polyhydric organic compound as the initiator or starter such as disclosed e. g. in U.S. Pat. No. 3,846,462. Illustrative of suitable polyhydric organic initiators are any one of the following which may be employed individually or in combination; ethylene glycol, diethylene glycol; propylene glycol; 1,5-pentanediol; hexylene glycol; dipropylene glycol; trimethylene glycol; 1, 2-cyclohexanediol; 3-cyclohexane-1, 1-dimethanol and the 3, 4-dibromoderivative thereof; glycerol; 1, 2,6-hexanetriol; 1, 1, 1-trimethylolethane; 1, 1, 1-trimethylolpropane; 3-(2-hydroxyethoxy)- and 3-(2-hydroxypropoxy)-1, 2-propanediols; 2, 4-dimethyl-2-(2-hydroxyethoxy)methylpentanediol-1, 5; 1, 1, 1-tris[(2-hydroxyethoxy)methyl]ethane; 1, 1. 1-tris[(2-hydroxypropoxy)methyl]propane; pentaerythritol; sorbitol; sucrose, alpha-methyl glucoside; and other such polyhydric compounds consisting of carbon, hydrogen and oxygen and having usually not more than about 15 carbon atoms per molecule. The alkylene oxides usually employed in providing the polyether polyol reactants are the lower alkylene oxides, that is, compounds having from 2 to 4 carbon atoms including ethylene oxide, propylene oxide, butylene oxides (1, 2- or 2,3-) and combinations thereof.

Another class of polyether polyols are polymer/polyether polyols which are also well known in the art. Such reactants are produced by polymerizing one or more ethylenically unsaturated monomers dissolved or dispersed in a polyether polyol in the presence of a free radical catalyst. Illustrative of suitable ethylenically unsaturated monomers are those encompassed by the formula

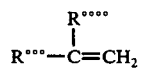

where: $R^{\circ\circ\circ}$ is hydrogen, methyl or any of the halogens (i.e., fluorine, chlorine, bromine or iodine); and $R^{\circ\circ\circ\circ}$ is $R^{\circ\circ\circ}$, cyano, phenyl, methyl-substituted phenyl, or alkneyl radicals having from 2 to 6 carbon atoms such as vinyl, allyl and isopropenyl groups. Typical examples of such polymerizable monomers are the following which may be employed individually or in combination; ethylene, propylene, acrylonitrile, methacrylonitrile, vinyl chloride, vinylidene chloride, styrene, alpha-methylstyrene, and butadiene. These and other polymer/polyol compositions which are suitably employed either individually or in combination with each other or with poly)oxyalkylene)polyols are those described in British patent specification No. 1,063,222 and U.S. Pat. No. 3,383,351, the disclosures of which are incorporated herein by reference thereto.

The particular polyether polyol or mixtures thereof employed merely depend upon the end-use of the polyurethane foam desired. Usually diols provide soft foams. Firmer foams are obtained by the incorporation of polyether polyols having more than two hydroxyl groups, including triols, tetraols, pentols and hexols. When it is desired to produce polyurethanes having comparatively high load-bearing properties and/or diecutability, polymer/polyether polyols of the aforesaid type are used. In the production of flexible polyurethane foams the hydroxyl number of the polyether polyol reactant including mixtures of polyols may vary from about 20 to about 150 and is usually no higher than about 80.

More particularly this invention is directed to the production of polyester polyol-based urethane foam, especially flexible polyester polyurethane foam which most preferably also contains a flame retarding agent. As indicated above the acrylonitrile-capped polyoxyalkylene-polysiloxane polymers of this invention intended for use as stabilizers of polyester polyol-derived foam can be used as such without the need for combination with an anionic or cationic organic surfactant or other type of organic additive.

However, it is often the preferred practice of foam manufacturers to premix the foam stabilizer, amine catalyst and water (which is the usual source of at least part of the blowing action) and to feed the aqueous premixture to the polyester foam-producing reaction mixture as a single stream. Thus, it is desirable to employ the acrylonitrile-capped polyoxyalkylene-polysiloxane polymer foam stabilizers of this invention in solution in combination with an organic acidic component, a water soluble organic surfactant and/or a water soluble glycol in order to avoid premix incompatibility. Although these various organic additives can be introduced directly to the aqueous premixture of foam stabilizer and catalyst, the formation of clear homogeneous aqueous solutions is facilitated by blending the additives with the foam stabilizer (that is the acrylonitrile-capped polyoxyalkylene-polysiloxane polymers of this invention) and combining the resulting blend with water and the amine catalyst system.

Thus, in accordance with another embodiment of this invention, therefore, solution compositions are provided comprising the acrylonitrile-capped polyoxyalkylene-polysiloxane polymers of this invention, the aforesaid organic acid component, and one or both of an organic surfactant and glycol. The acrylonitrile-capped polyoxyalkylene-polysiloxane polymers of this invention may be present in the solution compositions in an amount of from about 10 to about 80 parts by weight per 100 parts by weight of the solution. Suitable organic acidic components, organic surfactants and glycols for this purpose are as described in U.S. Pat. Nos. 3,793,360 and 3,833,512, the disclosures of which are incorporated herein by reference thereto.

For instance the aforesaid organic acidic comonent comprises the saturated and unsaturated aliphatic and cycloaliphatic carboxylic acids containing from 15 to 20 carbon atoms. Illustrative of suitable acidic components are the fatty acids such as, for example, palmitic, stearic, palmitoleic, oleic, linoleic, linolenic and ricinoleic acids; resin acids of the abietic and pimaric type; and any combination of the aforesaid acids as well as industrial by-products and naturally-occurring materials comprising such acids. An especially suitable acidic component of the solution compositions and aqueous premixtures of this invention is tall oil which is a by-product of sulfate digestion of wood pulp and is composed largely of fatty acids (oleic, linoleic, linolenic and palmitic acids) and resins acids, and a minor amount of neutral material such as fatty acid esters.

The above-described organic acidic component can be present in the solution compositions of this invention in an amount of from about 5 to about 90 parts by weight per 100 parts by weight of silicone polymer present in the solution.

The water-soluble organic surfactant which can be a component of the solution compositions of this invention may be of the nonionic, anionic, cationic or amphoteric types, including combinations thereof. Preferably, the organic surfactant is a nonionic surfactant such as: the poly)oxyalkylene) ethers of the higher alcohols having from 10 to 18 carbon atoms including mixtures thereof; polyoxyalkylene ethers of alkyl-substituted phenols in which the alkyl group can have from 6 to 15 carbon atoms; and corresponding polythioalkylene adducts of the aforesaid higher alcohols and phenols. The length of the ether chain is such that appropriate hydrophilic character is provided to balance the hydrophobic portion derived from the alcohol or phenol and render the compound soluble in water. The chain may contain oxyethylene units either as essentially the sole type of unit or oxyethylene in combination with a minor amount of oxypropylene. It is preferred that the hydrophilic portion of the nonionic surfactants be composed essentially of oxyethylene monomeric units. Usually the average number of such —$OC_2H_4$— units ranges from about 4 to about 20, although upwards of 40 such units can also be present.

Typical examples of nonionic surfactants which can be used as components of the solution compositions of this invention are the adducts produced by reaction of $k$ moles of ethylene oxide (wherein $k$ has a value of from about 4 to about 40, inclusive of whole and fractional numbers) per mole of any of the following hydrophobes including mixtures thereof; n-undecyl alcohol, myristyl alcohol, lauryl alcohol, trimethyl nonanol, tridecyl alcohol, pentadecyl alcohol, cetyl alcohol, oleyl alcohol, stearyl alcohol, nonylphenol, dodecylphenol, tetradecylphenol, and the like.

Other illustrative water soluble organic surfactants which can be present as a component of the solution compositions of this invention are: sodium, potassium ammonium and quaternary ammonium salts of sulfonic acids wherein the hydrocarbyl portion can be alkyl or alkaryl groups containing from 10 to 20 carbon atoms. Examples of such organic surfactants are: sodium tetradecyl sulfonate and sodium dodecylbenzene sulfonate; sodium and potassium salts of sulfonated petroleum fractions such as mineral oil; diethylamine salts of sulfonated $C_1$–$C_{15}$ alkylated aromatic hydrocarbons; taurine compounds having at least one long chain hydrocarbyl group bonded to nitrogen; and the like.

The solution compositions of this invention may also contain as a third type of organic component, a glycol of from 2 to about 10 carbon atoms, or low molecular weight Carbowax polyethylene glycols. Especially suitable is hexylene glycol (2-methyl-2,4-pentanediol).

When both the organic surfactant and glycol components are present in the solution compositions of this invention, the combinated concentration thereof ranges from about 5 to about 90 parts by weight per 100 parts by weight of the silicon polymer contained herein. When only one of these components is present, the concentration thereof is also within this latter range.

When the aforesaid solution compositions of the silicone polymers of this invention are combined water and amine catalyst such as the catalysts described hereinbelow, clear, homogeneous aqueous solutions are obtained which can be added directly to the foam-producing reaction mixture. From the standpoint of retaining these desirable characteristics of clarity and homogeneity under otherwise adverse ambient temperatures which may be encountered upon standing, storage or shipment prior to use in the foam-producing reaction, the preferred aqueous premixtures are those containing both the organic surfactant (of which nonionics are preferred) and the glycol, in addition to the organic acidic component. It is to be understood that the aforesaid invention are also useful when added directly to the final foam-producing reaction mixture rather than being premixed with water and amine catalyst.

In producing polyester polyol-based urethanes one or more polyester polyols is employed for reaction with the polyisocyanate reactant to provide the urethane linkage. Such polyester polyols as well as methods for their manufacture are well known in the art as seen for example, by U.S. Pat. No. 3,793,360. For instance, polyester polyols employed in producing flexible polyester urethane foams in accordance with the method of this invention are the reaction products of: (1) a polyfunctional organic carboxylic acid, and (2) one or more of the aforesaid polyether polyols or one or more of the aforesaid polyhydric organic initiators which are reacted with alkylene oxide to produce such polyether polyols. The polyester polyols contain at least two hydroxyl groups per molecule (as alcoholic OH or as OH in COOH groups). The functionality of these acids si preferably provided by carboxy groups (COOH) or by both carboxy groups and alcoholic hydroxyl groups. The polyesters can have hydroxyl numbers from about 20 to about 150, and preferably have hydroxyl numbers between about 35 and about 80. These hydroxyl numbers are readily determined according to the procedure described by Mitchel et al., Organic Analysis Vol. I (Interscience Publishers, New York 1953). Typical of the polyfunctional organic carboxylic acids that can be employed in producing polyester polyols useful in preparing the foams of this invention are: dicarboxylic aliphatic acids such as succinic, adipic, sebacic, azelaic, glutaric, pimelic, malonic and suberic acids; and dicarboxylic aromatic acids such as phthalic acid, terephthalic acid, isophthalic acid and the like. Other polycarboxylic acids that can be employed are the "dimer acids" such as the dimer of linoleic acid. Hydroxyl-containing monocarboxylic acids (such as ricinoleic acid) can also be used. Alternatively, the anhydrides of any of these various acids can be employed in producing the polyester polyols. The polyhydric alcohols (organic polyols) that can be employed in producing the polyester polyol starting material used in the process of this invention include the monomeric polyhydric alcohols such as for example, glycerol; 1,2,6-hexanetriol; ethylene glycol; diethylene glycol; trimethylol propane; trimethylolethane; pentaerythritol; propylene glycol; 1, 2-, 1,3- and 1,4-butylene glycols; 1,5-pentanediol; sorbitol; and the like, including mixtures thereof.

Other polyhydric alcohols that can be employed in producing the polyester polyols useful in this invention are the polymeric polyhydric alcohols which include the linear and branched chain polyethers having a plurality of acyclic ether oxygens and at least two alcoholic hydroxyl radicals. Illustrative of such polyether polyols are the poly(oxyalkylene) polyols containing one or more chains of connected oxyalkylene radicals which are prepared by the reaction of one or more alkylene oxides with acyclic and alicyclic polyols. Examples of the poly(oxyalkylene) polyols include the poly(oxyethylene) glycols prepared by the addition of ethylene oxide to water, ethylene glycol or diethylene glycol; glycols prepared by the addition of propylene oxide to water, propylene glycol or dipropylene glycol; mixed oxyethylene-oxypropylene polyglycols prepared in a similar manner utilizing a mixture of ethylene oxide and propylene oxide or a sequential addition of ethylene oxide and propylene oxide; and the poly(oxybutylene)-glycols and copolymers such as poly(oxyetheylene-oxybutylene) glycols and poly(oxypropylene-oxybutylene) glycols. Included in the term "poly(oxybutylene) glycols" are polymers of 1,2- butyleneoxide and 2,3-butyleneoxide.

Illustrative of further polyester polyol reactants that are useful in producing flexible polyester urethane foam in accordance with the process of this invention are the reaction products of any of the aforesaid polycarboxylic acids and the polyhydric alcohols prepared by the reaction of one or more alkylene oxides such as ethylene oxide, propylene oxide, butylene oxide and mixtures thereof, with any of the following: glycerol; trimethylolpropane; 1,2,6-hexanetriol; pentaerythritol; sorbitol; glycosides such as methyl, ethyl, propyl, butyl and 2-ethylhexyl arabinoside, xyloside, fructoside, glucoside, and rhammoside; sucrose; mononuclear polyhydroxylbenzenes such as resorcinol, pyragallol, phloroglucinol, hydroquinone, 4,6-di-tertiary-butylcatechol, and catechol; polynuclear hydroxylbenzenes("polynuclear" designating at least two benzene nuclei) such as the di-, tri- and tetra-phenylol compounds in which two to four hydroxybenzene groups are attached either directly by means of single bonds or through an aliphatic hydrocarbon radical containing 1 to 12 carbon atoms, such compounds being typically illustrated by 2,2-bis(p-hydroxyphenyl)-propane, bis(p-hydroxyphenyl)-methane and the various diphenols and diphenol methanes disclosed in U.S. Pat. Nos. 2,506,486 and 2,744,882, respectively. Another type of polyester polyol reactant is that produced by reaction of a polycarboxylic acid and the polyether adducts formed by reaction of ethylene oxide, propylene oxide or butylene oxide with phenol-formaldehyde condensation products such as the novolaks.

The organic polyisocyanates that are useful in producing polyether and polyester foam in accordance with the process of this invention are organic compounds that contain at least two isocyanato groups. Such compounds are well known in the art for producing polyurethane foams and are conveniently represented by the general formula Q'(NCO)$_i$ wherein $i$ is an integer of 2 or more and Q' is an organic radical having the valence of $i$. Q' can be a substituted or unsubstituted hydrocarbon group (e.g. alkylene, cycloalkylene, arylene, alkarylene, aralkylene and the like). Q' can also be a group having the formula Q"—Z'—Q" wherein Q" is an alkylene or arylene group and Z' is a divalent moiety such as —O—, —O—Q"—O—, —C(O)—, —S—, —S—Q"—S—, or —SO$_2$—.

Illustrative of suitable organic polyisocyanate reactants are the following including mixtures thereof:

1,12-diisocyanato-ethane;
1,3-diisocyanato-propane;
1,4-diiocyanato-butane;
1,5-diisocyanato-pentane;
1,6-diisocyanato-hexane;
1,5-diisocyanto-2,2-dimethyl-pentane;
1,7-diisocyanato-heptane;
1,5-diisocyanato-2,2,4-trimethyl-pentane;
1,8-diisocyanato-octane;
1,9-diisocyanato-nonane;
1,10-diisocyanato-decane;
1,11-diisocyanato-undecane;
1,12-diisocyanato-dodecane;
1,6-diisocyanato-3-methoxy-hexane;
1,6-diisocyanato-3-butoxy-hexane;
bis(3-isocyanato-propyl)ether
the (bis(3-isocyanato-propyl)ether of 1,4-butylene glycol;
(OCNCH$_2$CH$_2$CH$_2$OCH$_2$)$_2$O;
bis(2-isocyanatoethyl)carbonate;
1-methyl-2,4-diisocyanato-cyclohexane;
1,8-diisocyanato-p-methane;
mixtures of 2,4-and 2,6-tolylene-diisocyanate;
2,4-tolylene-diisocyanate;
2,6-tolylene-diisocyanate;
crude tolylene-diisocyanates;
bis-5-6(2-isocyanatoethyl)bicyclo[2.2.1]hept-2-ene;
bis(3-isocyanato-propyl)sulfide;
bis(isocyanato-hexyl)sulfide;
1,4-phenylene-diisocyanate;
xylylene diisocyanates;
4-chloro-1,3-phenylene-diisocyanate;
4-bromo-1,3-phenylene-diisocyanate;
4-nitro-(1,3 or 1,5)-phenylene-diisocyanate;
4-ethoxy-1,3-phenylene-diisocyanate;
benzidine diisocyanate;
toluidine diisocyanate;
dianisidine diisocyanate;
2,4'- or 4,4'-diisocyanato-diphenyl ether;
diphenylmethane-4,4'-diisocyanate;
4,4'-dissocyanato-dibenzyl;
isopropyl-benzene-alpha-4-diisocyanate;
1,5-diisocyanato-naphthalene;
1,8-diisocyanato-naphthalene;
9,10-diisocyanato-anthracene;
triphenylmethane-4,4'4"-triisocyanate;
2,4,6-toluene triisocyanate;

and many other organic polyisocyanates that are known in the art such as those disclosed in an article by Siefken, Ann., 567, 75 (1949). In general, the aromatically unsaturated polyisocyanates are preferred.

Further included among the isocyanates useful in the process of this invention are dimers and trimers of isocyanates and diisocyanates and polymeric diisocyanates such as those having the general formula:

[Q(NCO)$_i$]$_j$ in which $i$ and $j$ are integers of 2 or more and/or (as additional component in the reaction mixtures) compounds of the general formula:

L'(NCO)$_i$ in which $i$ is 1 or more and L' is a monofunctional or polyfunctional atom or radical. Examples of this type include ethylphosphonic diisocyanate, C$_2$H$_5$P(O)(NCO)$_2$; phenylphosphonic diisocyanate, C$_6$H$_5$P(O)(NCO)$_2$; compounds containing an ≡Si—NCO group, isocyanates derived from sulfonamides (QSO$_2$NCO), cyanic acid, thiocyanic acid, and compounds containing a metal—NCO radical such as tributyltin isocyanate.

Also included as useful in the preparation of the flexible polyester urethane foams in accordance with the process of this invention are the polyisocyanates of the aniline-formaldehyde polyaromatic type which are produced by phosgenation of the polyamine obtained by acid-catalyzed condensation of aniline with formaldehyde. Poly(phenylmethylene) polysiocyanates of this type are available commercially under such trade names as PAPI, AFPI, Mondur MR, Isonate 390 P, NCO-120 and NCO-20. These products are low viscosity (50–500 centipoises at 25° C.) liquids having average isocyanato functionalities in the range of about 2.25 to about 3.2 or higher, depending upon the specific aniline-to-formaldehyde molar ratio used in the polyamine preparation.

Other useful polyisocyanates are combinations of diisocyanates with polymeric isocyanates containing more than two isocyanto groups per molecule. Illustrative of such combinations are: a mixture of 2,4-tolylene diisocyanate, 2,6-tolylene diisocyanate and the aforesaid poly(phenylmethylene) polyisocyanates; and a mixture of isomeric tolylene diisocyanates with polymeric tolylene diisocyanates obtained as residues from the manufacture of the diisocyanates.

On a combined basis, the polyether or polyester polyol and organic polyisocyanate usually constitute the major proportion by weight of the polyurethane-forming reaction mixture. In general, the polyisocyanate and polyol reactants are employed in relative amounts such that the ratio of total —NCO equivalents to total active hydrogen equivalent (of the polyol and any water, when used) is from about 0.8 to about 1.5, preferably from about 0.9 to about 1.2, equivalents of —NCO per equivalent of active hydrogen. This ratio is known as the Isocyanate Index and is often also expressed as a percent of the stoichiometric amount of polyisocyanate required to react with total active hydrogen. When expressed as a percent, the Isocyanate Index may be from about 80 to about 150, and is preferably within the range from about 90 to about 120.

The urethane-forming reaction is effected in the presence of a minor amount of a catalyst comprising an amine. This component of the polyurethane-forming reaction mixture is usually a tertiary-amine as disclosed for example in U.S. Pat. No. 3,793,360. Suitable amine catalysts include one or more of the following: N-methyl-morpholine; N-ethylmorpholine; N-octadecylmorpholine; triethylamine; tributylamine; trioctylamine; N,N,N',N'-tetramethylethylenediamine; N,N,N',N'-tetramethyl-1,3-butanediamine; triethanolamine; N,N-dimethylethanolamine; triisopropanolamine; N-methyldiethanolamine; hexadecyldimethylamine; N,N-dimethylbenzylamine; trimethylamine; bis[2-(N,N-dimethylamino)ethyl]ether; triethylenediamine (i.e., 1,4-diazabicyclo[2.2.2.]octane); the formate and other salts of triethylenediamine; oxyalkylene adducts of the amino groups of primary and secondary amines and other such amine catalysts which are well known in the art of polyurethane manufacture. Also useful are the beta-tertiary amino amides and esters described in U.S. Pat. No. 3,821,131, as exemplified by 3-(N,N-dimethylamino)-N',N'-dimethylpropionamide. Also useful as the amine catalyst are the beta-tertiary-amino nitriles described in copending application Ser. No. 369,556, filed June 13, 1973, now U.S. Pat. No. 3,925,268, such as in particular, 3-(N,N-dimethylamino)propionitrile as such or in combination with other tertiary amines such as bis-[2-N,N-dimethylamino)ether]ether. The amine catalyst may be introduced to the polyurethane-producing reaction mixture as such or as a solution in suitable carrier solvents such as diethylene glycol, dipropylene glycol, and 2-methyl-2,4-pentanediol ("hexylene glycol"), and the like.

The amine catalyst is present in the final urethane-producing reaction mixture in a catalytic amount such as from about 0.05 to about 8 parts by weight of active catalyst (that is, the amine exclusive of other components present in solutions thereof) per 100 parts by weight of the polyol reactant. In forming polyether polyol urethane foam, the amine catalyst concentration is usually no higher than about 3 parts. In forming polyester polyol urethane foam, the preferred concentration of total amine catalyst is a least about 0.2 up to about 8 parts, although more than about 5 parts is usually not required.

In producing polyurethane from polyether polyols the usual practice is to include as a further component of the reaction mixture a minor amount of certain metal catalysts which are useful in promoting gellation of the foaming mixture. Such supplementary catalysts are well known to the art of flexible polyether-based polyurethane foam manufacture. For example, useful metal catalysts include organic derivatives of tin, particularly stannous salts of carboxylic acids, dialkyltin dicarboxylates, polyalkyl tin oxides and tin mercaptides. Typical of such cocatalysts are stannous octoate, stannous oleate, stannous acetate, stannous laurate and dibutyltin dilaurate. Additional metal catalysts are organic derivatives of other polyvalent metals such as zinc and nickel (e.g., nickel acetylacetonate). In general, the amount of such metal co-catalysts which can be present in the polyurethane-producing reaction mixture is within the range from about 0.05 to about 2 parts by weight per 100 parts by weight of the polyether polyol reactant. Although such metal catalysts are suitably employed in the preparation of polyether polyol urethane foam, their use is generally avoided in the manufacture of foam derived from a polyester polyol.

The amine catalyst may also be used in combination with other additives such as any of the nonionic organic surfactants described above in connection with the solution compositions of this invention. Examples of nonionics which are especially useful as components of the catalyst solutions are the oxyethylated nonylphenol compounds represented by the general formula

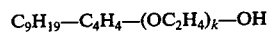

wherein $k$ is a number having an average value of from about 9 up to about 20 or more, including average values of $k$ which are either whole or fractional numbers such as 9, 10.5, 15 and the like. When used, the nonionic organic surfactant may be present in an amount from about 10 to about 80 weight percent, based on the total weight of the catalyst solution. The catalyst solution may also include minor amounts of polysiloxane-polyoxyalkylene block copolymers and/or the organosilicone polymers of U.S. Pat. No. 3,793,360.

It is to be understood that any of the aforesaid amine catalysts or solutions thereof can be added directly to the foam-producing reaction mixture or they can be added in premixed form with water and the polymeric organsilicone foam stabilizers of this invention. In the latter event, the catalyst is preferably added as a component of the above described homogeneous aqueous premixture of this invention.

Foaming is accomplished by the presence in the reaction mixture of varying amounts of a polyurethane blowing agent such as water which, upon reaction with isocyanate generates carbon dioxide in situ, or through the use of blowing agents which are vaporized by the exotherm of the reaction, or by a combination of the two methods. Thus, in addition to or in place of water, other blowing agents which can be employed include methylene chloride, liquefied gases which have boiling points below 80° F. and above −60° F., or other inert gases such as nitrogen, carbon dioxide added as such, methane, helium and argon. Suitable liquefied gases include aliphatic and cycloaliphatic fluorocarbons which vaporize at or below the temperature of the foaming mass. Such gases are at least partially fluorinated and may also be otherwise halogenated. Fluorocarbon blowing agents suitable for use in foaming the formulations of this invention include trichlorofluoromethane, dichlorodifluoromethane, 1,1-dichloro-1-fluorethane, 1,1,1-tribluoro-2-fluoro-3,3-difluoro-4,4,4-trifluorobutane, hexafluorocyclobutene and octafluorocyclobutane. Another useful class of blowing agents include thermally unstable compounds which liberate gases upon heating, such as N,N′-dimethyl-N,N′-dinitrosoterephthalamide and the like. The generally preferred method of foaming for producing flexible foams is the use of water or a combination of water plus a fluorocarbon blowing agent such as trichloromonofluoromethane.

The amount of blowing agent employed will vary with factors such as the desired density of the foamed product. Usually, however, from about 1 to about 30 parts by weight of the blowing agent per 100 parts by weight of the polyol reactant is preferred. It is to be understood, however, that these are general guidelines and that the choice of the particular amount of blowing agent employed to obtain a desired foam density specification varies from formulation to formulation and is well within the skill of the art to which the present invention pertains.

The organic flame retardants that can be employed in producing urethane foam stabilized with the acrylonitrile-capped polyoxyalkylene-polysiloxane polymers of the invention, can be chemically combined in one or more of the other materials used (e.g., in the polyol or polyisocyanate), or they can be used as discrete chemical compounds added as such to the foam formulation and are well known in the art as seen by U.S. Pat. No. 3,793,360. The organic flame-retardants usually contain phosphorus or halogen, both phosphorus and halogen or phosphorus and nitrogen. Usually, the halogen, when present, is chlorine and/or bromine. Flame-retardants of the discrete chemical variety include: 2,2-bis(bromomethyl)-1,3-propanediol (also known as dibromoneopentyl glycol); 2,3-dibromopropanol; tetrabromophthalic anhydride; brominated phthalate ester diols such as those produced from tetra-bromophthalic anhydride, propylene oxide and propylene glycol; tetrabromobisphenol-A; 2,4,6-tribromophenol; pentabromophenol; brominated anilines and dianilines; bis(2,3-dibromopropyl)ether or sorbitol; tetrachlorophthalic anhydride; chlorendic acid; chlorendic anhydride; diallyl chlorendate; chlorinated maleic anhydride; tris(2-chloroethyl)phosphate [(ClCH$_2$CO$_2$O)P(O)]; tris(2,3-dibromopropyl)phosphate; tris(2,3-dichloropropyl)-phosphate; tris(1-bromo-3-chloroisopropyl)phosphate; bis(2,3-dibromopropyl)phosphoric acid or salts thereof; oxypropylated phosphoric and polyphosphoric acids; polyol phosphites such as tris(dipropylene glycol) phosphite; polyol phosphonates such as bis(dipropylene glycol)hydroxymethyl phosphonate; di-poly(oxyethylene)-hydroxymethyl phosphonate; di-poly(oxypropylene)-phenyl phosphonate; di-poly(oxypropylene)-chloromethyl phosphonate; di-poly(oxypropylene)butyl phosphonate; and O,O-diethyl-N,N-bis(2-hydroxyethyl)-aminomethyl phosphonate. Also suitable are compounds having the formulas:

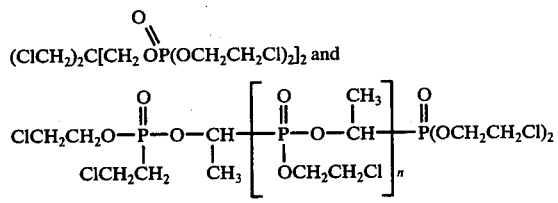

which are available from Monsanto Chemical Company under the names Phosgard 2XC-20 and Phosgard C-22-R, respectively. Other suitable flame-retardants comprise halogen-containing polymeric resins such as polyvinylchloride resins in combination with antimony trioxide and/or other inorganic metal oxides such as zinc oxide, as described in U.S. Pat. Nos. 3,075,927; 3,075,928; 3,222,305 and 3,574,149. Illustrative of suitable inorganic phosphorus-containing flame-retardants is the ammonium polyphosphate available from Monsanto Chemical Company under the name Phoscheck P30. The latter is especially useful as a flame-retardant for polyester urethane foam. It is to be understood that other flame-retardants known to the art may be used and that the aforesaid compounds may be employed individually or in combination with one another.

Of the above flame-retardants, those of the discrete chemical compound variety which contain groups reactive with hydroxyl or isocyanato groups can be used as reactants in producing the polyether polyol or polyester polyol or they can be reacted with organic polyisocyanates, to produce corresponding modified polyols or polyisocyanates having chemically combined flame-retarding groups. Such modified polyols and polyisocyanates are also useful as reactants in the process of this invention. In such cases, due regard must be given to the possible effect of the functionality of the compound on the other properties (e.g., degree of flexibility of the resulting foam.

The flame-retarding agent can be present in the foam formulations described herein in an amount from about 1 to about 30 parts by weight per one hundred parts by weight of the polyol reactant. Usually the flame-retardant is employed in an amount of at least about 5 parts by weight per 100 parts by weight of polyol. As will be evident to those having skill in the art, the particular amount of flame-retardant employed depends largely on the efficiency of any given agent in reducing flammability of polyurethane foam.

The polyurethane foams may be formed in accordance with any of the processing techniques known to the art. Usually the "one-shot" process is used. In this method, the polyol and polyisocyanate reactants are independently added to the foam-producing reaction mixture and the —OH/—NCO reaction is effected simultaneously with the foaming operation. It is often convenient to add the foam stabilizing component comprising the acrylonitrile-capped polyoxyalkylene-polysiloxane polymers of the present invention to the reaction mixture as a premixture with one or more of the blowing agent, polyol, amine catalyst and, when used, the flame-retardant. The foaming and urethane-forming reactions occur without the application of external heat. Often the resulting foam is cured by heating the foam at a temperature between about 100° C. and about 150° C. for about 5 to about 60 minutes to eliminate any surface tackiness, as desired. It is to be understood that variations in process conditions and manipulative steps can be used as known in the art. For example, the various ingredients of the reaction mixture can be combined and the foaming reaction mixture poured into a mold, or the various ingredients can be combined and the foaming reaction mixture commenced and completed in a mold.

The relative amounts of the various components present in the foam-producing reaction mixture are not narrowly critical. The polyol and polyisocyanate are present in the foam-producing formulation in a major amount. The relative amounts of these two components is the amount required to produce the urethane structure of the foam and such relative amounts are well known in the art. The source of the blowing action such as water, auxiliary blowing agents, catalyst and the foam stabilizer are each present in a minor amount necessary to achieve the function of the component. Thus, the blowing agent is present in a minor amount sufficient to foam the reaction mixture, the amine catalyst is present in a catalytic amount (i.e., an amount sufficient to catalyze the reaction to produce the urethane at a reasonable rate), and the acrylonitrile-capped polyoxyalkylene-polysiloxane polymers of this invention are present in a foam-stabilizing amount, that is, in an amount sufficient to stabilize the foam. The preferred amounts of these various components are as given hereinabove.

If desired, other additional ingredients can be employed in minor amounts in producing the polyurethane foams in accordance with the process of this invention. For example, the solution compositions of the silicone polymer foam stabilizers of this invention as well as the aqueous premixtures can contain such components as inhibitors such as e.g., d-tartaric acid, tertiary-butyl pyrocatechol and di-tert-butyl-p-cresol ("Ionol"), which reduce any tendency of the foamed product to oxidative or hydrolytic instability. Further, when the foam stabilizers of this invention and/or the amine catalyst are employed as respective solutions, water soluble carrier solvents and components thereof are, of course, introduced into the aqueous premixtures without however, any deleterious affect on the effectiveness of homogeneity of the aqueous solution premixtures. Additional illustrative additives are: cross-linking agents such as glycerol, triethanolamine and their oxyalkylene adducts; compression set additives (e.g., hexylene glycol); additives to regulate cell structure so as to coarsen cells and hereby reduce the tendency of the foam to split (e.g., paraffin oil); fillers; dyes; pigments; and particularly in regard to polyester polyol-derived foam, anti-discoloration additives including anti-scorch and antioxidation agents such as phenols substituted with tertiary-butyl groups as exemplified by 2,6-di-tert-butyl-4-methylphenol ("Ionol"), oxirane-containing compounds (e.g., propylene oxide), triorgano-(e.g., triphenyl-)substituted phosphites and phosphines, and other anti-discoloration additives known to the art.

The flexible urethane foams produced in accordance with this invention can be used in the same areas as conventional polyether and polyester urethane foams, the products formed with a flame-retarding agent being especially useful where reduced combustibility properties are beneficial. Thus, the foam products are useful as textile interliners, cushioning materials for seating and mattresses, for packaging of delicate objects, as gasketing materials, and the like.

As seen by the following examples the acrylonitrile-capped polyoxyalkylene-polysiloxane polymers of this invention possess a highly desirable combination of properties. For instance even when employed in the absence of additional organic surfactants they have been found to be effective stabilizers for flexible polyester foam and further allow for the formation of said foam having a low burning extent when said foam contains a flame retardant. Moreover, said siloxane polymers of this invention can also be blended with organic surfactants which blended surfactants can form clear homogeneous premixes, effectively stabilize flexible polyester foam, and further allow for the formation of said foam having a low burning extent when said foam contains a flame-retardant. In addition said siloxane polymers of this invention have excellent potency as stabilizers for flexible polyester foam and thus furnish a wide processing latitude for the production of said foam.

The following examples illustrate the present invention and are not to be regarded as limitative. It is to be understood that all parts, percentages and proportions referred to herein and in the claims are by weight unless otherwise indicated. Moreover, as used herein the following terms have the indicated significance:

In the formulas "Me" designates a methyl group, —$CH_3$.

"GPC" denotes that the number average molecular weight ($\overline{MN}$) for various polymer compositions of this invention were measured by Gel Permeation Chromatography (abbreviated in the examples as "GPC") using a calibration curve showing the relationship between the respective elution volumes established for dimethylsiloxane fluids of different molecular weights and the respective known molecular weights of such fluids. In establishing the calibration curve, the various dimethylsiloxane fluids were in solution in trichloroethylene solvent using styragel packed columns. In measuring the molecular weights of the polymers described herein, the elution volume observed for any particular polymer product (in trichloroethylene solvent) was equated with the corresponding elution volume of the calibration curve, and the molecular weight associated with that particular elution volume was assigned as the molecular weight of the polymer product. Gel Permeation Chromatography as a technique for measuring molecular weight is discussed in "Polymer Fractionation" (ed. Manfred J. R. Cantow, Academic Press, Inc. New York 1967), pages 123–173, Chapter B4, entitled "Gel Permeation Chromatography," by K. H. Altgelt and J. C. Moore. In determining the molecular weights given in the examples, the particular procedure employed was that described in the article entitled "Characterization of Silicones by Gel Permeation Chromatography" by F. Rodriguez et al. in *I & EC Product and Development*, Vol. 5, No. 2, page 121 (June 1966) using five styragel packed columns (Water Associates, Inc.) having a pore size of $10^3 A$, $3 \times 10^3 A$, $10^4 A$, $3 \times 10^4 A$, and $8 \times 10^3 A$, respectively.

"Rise" denotes the foam height and is directly proportional to potency of the surfactant.

"Breathability" denotes the porosity of a foam, being roughly proportional to the number of open cells in a foam, and was measured in accordance with the NOPCO breathability test procedure described by R. E. Jones and G. Fesman, "Journal of Cellular Plastics" (January, 1965). In accordance with this test, breathability is measured as follows: A 2 inch × 2 inch × 1 inch piece of foam is cut from near the center of the bun. Using a Nopco Foam Breathability Tester, Type GP-2 Model 40GD10, air is drawn through the foam sample at a pressure differential of 0.5 inches of water less than atmospheric pressure. The air flow is parallel to the direction of original foam rise. The degree of openness of the foam (or foam breathability) is measured by the rate of air flow through the foam and is reported in standard cubic feet per minute (SCFM).

"CPI" denotes "cells per inch", that is, the number of cells per linear inch of the foam. CPI is directly proportional to the fineness of the cell structure. "Burning Extent" was determined in accordance with standard flammability test procedure ASTM D-1692-68. Burning extent denotes the burned length (in inches) of the foam and is reported as the average of the results obtained with the various test specimens of a given foam. On the basis of this test, an average burning extent of less than 5.0 inches qualifies the foam for a self-extinguishing ("SE") rating. When the burning extent of at least one test specimen is 5.0 inches or greater, the foam is assigned a burning ("B") rating and usually no further specimens of that foam are tested.

"Burning Time" denotes the average time (in seconds) taken to give the specified burning extent.

"Top Collapse" denotes settling of the foam height upon cooling.

SURFACTANTS OF THIS INVENTION

"Surfactant AA" denotes a blended composition consisting of

| Component | Parts by Weight |
|---|---|
| Siloxane Surfactant[1] | 52 |
| Nonionic Surfactant[2] | 10.4 |
| Tall Oil | 15.6 |
| Hexylene Glycol | 21.0 |
| Ionol[3] | 1.0 |

[1]A siloxane polymer having the average composition formula $[Me_3SiO1/2]_{1.0}[C_6H_5CH_2O(C_2H_4O)_{7.7}C_3H_6Si(Me)O]_{1.0}[SiO4/2]_{0.9}$
[2]An organic nonionic surfactant in which the hydrophobe is a mixture of $C_{11}$ to $C_{15}$ alcohols and the hydrophile is ethylene oxide (avg. 9 mols/mol of hydrophobe).
[3]2,6-di-tertiary-butyl-p-cresol.

"Surfactant BB" denotes a siloxane polymer having the average composition formula

"Surfactant CC" denotes a blended composition consisting of

| Component | Parts by Weight |
|---|---|
| Siloxane Surfactant[1] | 35 |
| Anionic Surfactant[2] | 35 |
| Tall Oil | 15 |
| Hexylene Glycol | 15 |
| Ionol[3] | 2500 ppm |

[1]A siloxane polymer having the average composition formula $Me_3SiO(Me_2SiO)_{5.1}[MeO(C_2H_4O)_{7.2}C_3H_6Si(Me)O]_{7.5}SiMe_3$
[2]An organic anionic surfactant which is a sodium sulfonate of a petroleum hydrocarbon mixture a typical analysis of which is (wt. %) 62.0 sodium sulfonate; 32.7 mineral oil, 4.5 water; 0.7 inorganic salt; avg. mol. wt. of sulfonate portion to 435; flash point, C. O. C. 400° F.; available commercially as "Bryton 430".
[3]Parts per million parts of the other four components.

"Surfactant DD" denotes a siloxane polymer having the average composition formula $Me_3SiO(Me_2SiO)_{5.1}[MeO(C_2H_4O)_{7.2}C_3H_6Si(Me)O]_{7.5}SiMe_3$

EXAMPLE 1

In a three neck round bottom flask fitted with a mechanical stirrer, nitrogen sparge tube, thermometer, addition funnel, reflux column and cold water bath, about 5 grams of a 20 weight percent aqueous solution of NaOH (about 0.22 wt. % NaOH in the reaction mixture) were added to about 400 grams of an allyl and hydroxyl end-blocked polyoxyalkylene having an average molecular weight of about 388 and an average composition formula $H_2C = CHCH_2O (C_2H_4O)_{7.5}H$ (wt. % OH about 4.36) covered by an atmosphere of nitrogen. About 53.1 grams (about 100% of theory) of acrylonitrile ($H_2C = CHCH_2CN$) was then fed to the mixture over a 2 hour period with constant stirring. The temperature of the mixture was maintained by occasional cooling at about 25° C to 30° C. After this time the mixture was neutralized by the addition of about 2 grams of 85 weight percent aqueous phosphoric acid ($H_3PO_4$). The neutralized mixture was then mixed with Magnesol (magnesium silicate) and then filtered to give a clear off-colorless product filtrate. The filtrate was desolvated by rotary evaporation at a temperature not exceeding about 100° C. under reduced pressure to a constant weight. There was obtained about 498.5 grams of the desired polyether product having the average composition formula $H_2C = CHCH_2O(C_2H_4O)_{7.5}CH_2CH_2CN$ Analysis of the desired product showed about 0.8 weight % residual hydroxyl groups and that about 85 percent of the starting polyether was cyanoethylated.

EXAMPLE 2

In a manner similar to Example 1, the acrylonitrile-capped polyoxyalkylene composition product having the average formula $H_2C = CHCH_2O(C_2H_4O)_{7.9}CH_2CH_2CN$ was prepared using about 400 grams of $H_2C = CHCH_2O(C_2H_4O)hd 7.9 H$ (average mol. wt. about 406; wt. % OH about 4.36), about 0.5 grams of Ionol, about 2.5 grams of 20 wt. % aqueous NaOH (about 0.10 wt. % NaOH in the reaction mixture) and about 106.1 grams of acrylonitrile (about 200% of theory). The reaction was conducted at about 15° C. to 25° C. over 1¼ hours. After an additional 1⅝ hours the orange colored product composition was neutralized with about 1.0 gram of 85 wt. % aqueous $H_3PO_4$ and vacuum desolvated at 90° C/1.0 mm Hg. The neutralized reaction product was then mixed with about 60 grams of Magnesol, diluted with toluene and pressure filtered. The filtrate was then desolvated by rotary evaporation. Analysis of the desired polyether product showed about 0.03% residual hydroxyl groups and that about 99.3 percent of the starting polyether was cyanoethylated.

EXAMPLE 3

In a manner similar to Example 2, the acrylonitrile-capped polyoxyalkylene composition product having the average formula

$H_2C = CHCH_2O(C_2H_4O)_{7.9}CH_2CH_2CN$ was again prepared using about 400 grams of $H_2C = CHCH_2O(C_2H_4O)_{7.9}H$ (avg. mol. wt. about 406; wt. % OH about 4.36), about 0.05 grams of Ionol, about 10 grams of 20 wt. % NaOH (about 0.04 wt. % NaOH in the reaction mixture), and about 58 grams of acrylonitrile (about 110% of theory). The reaction was conducted at about 10° C to 13° C over 1¾ hours. After about an additional hour the pale yellow colored product composition was neutralized with about 1.0 gram of 85 wt. % aqueous $H_3PO_4$ and the neutralized product mixture then rotary evaporated and stripped at 90° C/0.3 mm Hg. The desired polyether product developed a deep orange to reddish color and analysis showed about 0.27 wt. % residual hydroxyl group and that about 93.8 percent of the starting polyether was cyanoethylated.

EXAMPLE 4

In a manner similar to Example 3, the acrylonitrile-capped polyoxyalkylene composition product having the average formula $H_2C = CHCH_2O(C_2H_4O)_{7.9}CH_2CH_2CN$ was again prepared using about 400 grams of $H_2C = CHCH_2O(C_2H_4O)_{7.9}H$ (average mol. wt. about 406; wt. % OH about 4.36), about 0.05 grams of Ionol, about 1.0 grams of 20 wt. % aqueous NaOH (about 0.044 wt. % NaOH in the reaction mixture) and about 53 grams of acrylonitrile (about 100% of theory). The reaction was conducted at about 8° C to 10° C. over 1 hour. After an additional hour the light yellow product composition was neutralized with about 0.5 grams of 85 wt. % aqueous $H_3PO_4$ and the neutralized mixture desolvated by rotary evaporation at 75° C/0.3 mm Hg. The product composition was then diluted with an equal amount of toluene, pressure filtered and the filtrate desolvated by rotary evaporation of 90° C/0.3 mm Hg. Analysis of the desired polyether product showed about 0.35% residual hydroxyl groups, that about 92 percent of the starting polyether was cyanoethylated and the product to have a Brookfield viscosity (at room temperature) at about 43 centipoises.

EXAMPLE 5

In a manner similar to Example 4, the acrylonitrile-capped polyoxyalkylene composition product having the average formula

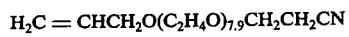
$H_2C = CHCH_2O(C_2H_4O)_{7.9}CH_2CH_2CN$ was again prepared using about 992 grams of $H_2C = CHCH_2O(C_2H_4O)_{7.9}H$ (avg. mol. wt. about 406; wt. % OH about 4.36), about 2.5 grams of 20 wt. % aqueous NaOH (about 0.045 wt. % NaOH in the reaction mixture), and about 131.5 grams of acrylonitrile (about 97.6% of theory). The reaction was conducted at about 3° C. to 5° C. over 3 hours. After an additional half hour the product composition was neutralized with about 1.25 grams of 85 wt. % aqueous $H_3PO_4$. About 50 grams of toluene were added to the neutralized reaction mixture which was then desolvated by rotary evaporation at 85° C/1.5 mm Hg. During this treatment the product turned wine-red in color. About 40 grams of Magnesol was then added to the product which was then pressure filtered. The filtrate was wine-red in color and analysis of the desired product showed about 0.34% residual hydroxyl groups, that about 92.2% of the starting polyether was cyanoethylated and the product to have a Brookfield viscosity (at room temperature) of about 37 centipoises.

EXAMPLE 6

In a manner similar to Example 5, the acrylonitrile-capped polyoxyalkylene composition product having the average formula

$H_2C = CHCH_2O(C_2H_4O)_{7.9}CH_2CH_2CN$ was again prepared using about 400 grams of $H_2C = CHCH_2O(C_2H_4O)_{7.9}H$ (avg. mol. wt. about 406; wt. % OH about 4.36), about 1.0 gram of 20 wt. % aqueous NaOH (about 0.044 wt. % NaOH in the reaction mixture), and about 49.0 grams of acrylonitrile (about 92% of theory). The reaction was conducted at about 3° C to 8° C over 2¾ hours. After an additional half hour the light yellow colored product composition was neutralized with about 0.45 grams of 85 wt. % aqueous $H_3PO_4$ and the neutralized mixture desolvated by rotary evaporation at 95° C/0.5 mm Hg. About 40 grams of Magnesol and about 400 grams of toluene were then added to the neutralized product which was then pressure filtered and the filtrate desolvated by rotary evaporation at 95° C/0.5 mm Hg. Analysis of the desired polyether product which was light yellow-brown in color showed about 0.5% residual hydroxyl groups, that about 88.7 percent of the starting polyether was cyanoethylated and the product to have a Brookfield viscosity (at room temperature) of about 37 centipoises.

EXAMPLE 7

In a manner similar to Example 6, the acrylonitrile-capped polyoxyalkylene composition product having the average formula

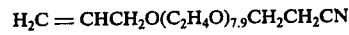
$H_2C = CHCH_2O(C_2H_4O)_{7.9}CH_2CH_2CN$ was again prepared using about 1000 grams of

$H_2C = CHCH_2O(C_2H_4O)_{7.9}H$ (avg. mol. wt. about 406; wt. % OH about 4.36), about 3.0 grams of a 20 weight percent aqueous solution of $Me_4NOH$ (about 0.05 wt. % $Me_4NOH$ in the reaction mixture), and about 143 grams of acrylonitrile (about 105% of theory). The reaction was conducted at about 10° C. to 18° C. over a 1 hour period. Infrared analysis at this time showed the presence of a slight amount of unreacted hydroxyl moiety. Stirring was maintained for an additional one half hour at about 18° C. after which infrared analysis indicated essentially a complete reaction. After this time the mixture was neutralized by addition of about 3.05 grams of 85 weight percent aqueous $H_3PO_4$. About 50 grams of Magnesol were added to the neutralized mixture which was then pressure fil-

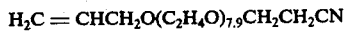

tered. Then about 200 grams of toluene were added to a 400 gram portion of the filtrate which was then desolvated by rotary evaporation at 90 ° C/< 0.5 mm Hg. Analysis of the desired polyether product thus obtained showed about 0.185 wt. % residual hydroxyl groups, that about 95.8 percent of the starting polyether was cyanoethylated and the product to have a Brookfield viscosity (at room temperature) of about 40 centipoises.

EXAMPLE 8

In a manner similar to Example 7, the acrylonitrile-capped polyoxyalkylene composition product having the average formula $$H_2C=CHCH_2O(C_2H_4O)_{10}CH_2CH_2CN$$

was prepared using about 300 grams of $H_2C=CHCH_2O(C_2H_4O)_{10}H$ (avg. mol. wt. about 500; wt. % OH about 3.40) in about 200 grams of toluene, about 0.65 grams of 20 wt. % aqueous Me$_4$NOH (about 0.023 wt. % Me$_4$NOH in the reaction mixture) and about 33.2 grams of acrylonitrile (about 110% of theory) in about 33.2 grams of toluene. The reaction was conducted at about 7° C to 17° C for about 2 hours. After an additional 1½ hours the light brown colored product composition was neutralized with about 0.75 grams of 85 wt. % aqueous H$_3$PO$_4$. About 30 grams of Magnesol was added to the neutralized mixture which was then pressure filtered. The filtrate was then desolvated by rotary evaporation at 90° C/< 1 mm Hg. Analysis of the desired polyether product which had a yellow color showed about 0.17 wt. % residual hydroxyl groups, that about 95 percent of the starting polyether was cyanoethylated and the product to have a Brookfield viscosity (at room temperature) of about 55 centipoises.

EXAMPLE 9

In a manner similar to Example 8, the acrylonitrile-capped polyoxyalkylene composition product having the average formula $$H_2C=CHCH_2O(C_2H_4O)_{9.5}(C_3H_6O)_{0.8}CH_2CH_2CN$$

was prepared using about 483 grams of $H_2C=CHCH_2O(C_2H_4O)_{9.5}-(C_3H_6O)_{0.8}H$ (average mol. wt. about 501.5; wt. % HO about 3.39; the oxyethylene and oxypropylene groups being present in a random fashion) in about 100 grams of toluene, about 1.5 grams of 20 wt. % aqueous Me$_4$NOH (about 0.047 wt. % Me$_4$NOH in the reaction mixture) and about 53.0 grams of acrylonitrile (about 110% of theory). The reaction was conducted at about 8° C to 18° C for about 2¾ hours. The light brown colored product composition was neutralized without 1.8 grams of 85 wt. % aqueous H$_2$PO$_4$ and the product turned light-yellow in color. About 30 grams of Magnesol was added to the neutralized mixture and the mixture pressure filtered. The filtrate was then desolvated by rotary evaporation at 90° C/< 0.5 mm Hg. Analysis of the yellow colored desired polyether product showed about 0.25 wt. % residual hydroxyl groups and that about 92.5 percent of the starting polyether was cyanoethylated.

EXAMPLE 10

In a manner similar to Example 9, the acrylonitrile-capped polyoxyalkylene composition product having the average formula $$CH_2=CHCH_2O(C_2H_4O)_{21.2}(C_3H_6O)_{5.35}CH_2CH_2CN$$

was prepared using about 300 grams of $$CH_2=CHCH_2O(C_2H_4O)_{21.2}(C_3H_6O)_{5.35}H$$

(avg. mol. wt. about 1250; wt. % OH about 1.36; the oxyethylene and oxypropylene groups being present in a random fashion) in about 200 grams of toluene; about 1.0 grams of 20 wt. % aqueous Me$_4$NOH (about 0.04 wt. % Me$_4$NOH in the reaction mixture) and about 15 grams of acrylonitrile (about 92% of theory) in about 15 grams of toluene. The reaction was conducted at about 15° C to 23° C for about 2 hours. The reaction product was neutralized with about 1.05 grams of 85wt. % aqueous H$_3$PO$_4$. About 15 grams of Magnesol was added to the neutralized mixture and the mixture pressure filtered. The filtrate was then desolvated by rotary evaporation at 90° C/< 0.5 mm Hg. Analysis of the yellow-light brown colored desired polyether product showed about 0.23 wt. % residual hydroxyl groups, that about 83 percent of the starting polyether was cyanoethylated and the product to have a Brookfield viscosity (at room temperature) of about 220 centipoises.

EXAMPLE 11

In a three-necked reaction flask equipped with a mechanical stirrer, distilling take-off head and thermometer a mixture of about 30.0 grams of a hydrosiloxane polymer having an average molecular weight of about 952 and the average formula $$Me_3SiO(Me_2SiO)_5(MeHSiO)_7SiMe_3$$

(Anal: Si—H, 165 cc H$_2$/gram; Calc: 0.2211 mole MeHSiO) and about 104.7 grams (0.2379 mole) of the acrylonitrile-capped polyoxyalkylene product of Example 1 having the average formula $$H_2C=CHCH_2O(C_2H_4O)_{7.5}CH_2CH_2CN$$

(about 7.7% excess of theory), and about 50 ml. of xylene was heated rapidly to 45° C. with constant stirring. At that temperature about 20 parts per million of platinum as chloroplatinic acid was added to the system. There was an exothermal reaction noted. The reaction mixture was maintained at 85° C–95° C for 1 hour after which analysis of the reaction mixture for residual Si—H was negative, indicating that the reaction had gone to completion. The reaction mixture was then cooled, neutralized with NaHCO$_3$, filtered and the filtrate desolvated by rotary evaporation at 50° C/5 mm Hg. The desired arylonitrile-capped polyoxyalkylene-polysiloxane product was a clear amber liquid having the average formula $$\begin{array}{c}MeSiO(Me_2SiO)_5(MeSiO)_7SiMe_3\\|\\CH_2CH_2CH_2O(C_2H_4O)_{7.5}CH_2CH_2CN\end{array}$$

This siloxane product, designated herein as Surfactant A, had a Brookfield viscosity (at about 25° C) of 480 centipoises and a GPC average molecular weight of 4,000.

EXAMPLE 12

In a manner similar to Example 11 a mixture of about 24.1 grams of a hydrosiloxane polymer having an average molecular weight of about 1012 and the average formula Me₃SiO(Me₂SiO)₅(MeHSiO)₈SiMe₃

(Anal: Si—H, 176.3 cc H₂/gram; Calc: 0.1898 mole MeHSiO) and about 119.5 grams of the acrylonitrile-capped polyoxyalkylene product of Example 4 having the average formula

H₂C=CHCH₂O(C₂H₄O)₇.₉CH₂CH₂CN (about 37% excess of theory) and about 110 grams of toluene was heated to about 79° C with stirring. The reaction mixture was then catalyzed with about 25 parts per million of platinum as chloroplatinic acid catalyst and the reaction conducted at 79° C to 115° C for 6 hours. Additional platinum catalyst, 20 ppm platinum after 10 minutes, and about 25 ppm platinum after 3 hours, was added during the reaction. After said 6 hours the reaction mixture was analyzed for residual Si—H and yielded 0.60 cc H₂/4.0cc sample, indicating that the reaction had gone to 99.0 percent completion. The reaction mixture was then cooled, neutralized with NaHCO₃ and filtered. The filtrate was then desolvated by rotary evaporation at 95° C/<0.3 mm Hg. The desired acrylonitrile-capped polyoxyalkylene-polysiloxane product was a clear brown liquid having the average formula Me₃SiO(Me₂SiO)₅(MeSiO)₈SiMe₃
|
CH₂CH₂CH₂O(C₂H₄O)₇.₉CH₂CH₂CN This siloxane product, designated herein as Surfactant B had a GPC average molecular weight of about 4,400.

EXAMPLE 13

In a manner similar to Example 12, a mixture of about 24.1 grams of a hydrosiloxane polymer having an average molecular weight of about 1012 and the average formula Me₃SiO(Me₂SiO)₅MeHSiO)₈SiMe₃

(Anal: Si—H, 176.3 ccH₂/gram; Calc: 0.1898 mole MeHSiO) about 119.5 grams of the acrylonitrile-capped polyoxyalkylene product of Example 6 having the average formula

H₂C=CHCH₂O(C₂H₄O)₇.₉CH₂CH₂CN (about 37% excess of theory), and about 110 grams of toluene was heated to about 81° C with stirring. The reaction mixture was then catalyzed with about 25 parts per million of platinum as chloroplatinic acid and the reaction conducted at 81° C to 100° C for 3 hours. Additional platinum catalyst, about 20 ppm platinum after ½ hour and about 15 ppm platinum after 2 hours, was added during the reaction. After said 3 hours, the reaction mixture was analyzed for residual Si—H and yielded 0.2 cc H₂/4cc sample, indicating that the reaction had gone to 99.7 percent completion. The reaction mixture was then cooled, neutralized with NaHCO₃ filtered and the filtrate desolvated by rotary evaporation at 95° C/<0.3 mm Hg. The desired acrylonitrile-capped polyoxyalkylene-polysiloxane product was a clear light brown liquid having the average formula Me₃SiO(Me₂SiO)₅(MeSiO)₈SiMe₃
|
CH₂CH₂CH₂O(C₂H₄O)₇.₉CH₂CH₂CN This siloxane product, designated herein as Surfactant C, had a Brookfield viscosity (at room temperature) of about 300 centipoises and a GPC average molecular weight of about 4500.

EXAMPLE 14

In a similar manner to Example 13, a mixture of about 25.4 grams of a hydrosiloxane polymer having an average molecular weight of about 1012 and the average formula Me₃SiO(Me₂SiO)₅(MeHSiO)₈SiMe₃

(Anal: Si—H 176.3 cc H₂/gram; Calc: 0.20 mole MeHSiO), about 161 grams of the acrylonitrile-capped polyoxyalkylene product of Example 8 having the average formula

H₂C=CHCH₂O(C₂H₄O)₁₀CH₂CH₂CN (about 40% excess of theory), and about 186.4 grams of toluene was heated to about 82° C with stirring. The reaction mixture was then catalyzed with about 25 parts per million platinum as chloroplatinic acid and the reaction conducted at 82° C to 98° C for 3½ hours. Additional platinum catalyst, about 20 ppm platinum after 20 minutes, about 20 ppm platinum after 1½ hours and about 25 ppm platinum about 3 hours was added during the reaction. After said 3½ hours the reaction mixture was analyzed for residual Si—H and yielded 0.60 cc H₂/5.0cc. sample indicating that the reaction had gone to 99 percent completion. The reaction product was cooled to room temperature, neutralized with NaHCO₃ and filtered. The filtrate was then desolvated by rotary evaporation at 95° C/< 0.5 mm Hg. The desired acrylonitrile-capped polyoxyalkylene-polysiloxane product was a clear brown liquid having the average formula Me₃SiO(Me₂SiO)₅(MeSiO)₈SiMe₃
|
CH₂CH₂CH₂O(C₂H₄O)₁₀CH₂CH₂CN This siloxane product, designated herein as Surfactant D, had a Brookfield viscoity (at room temperature) of about 500 centipoises and a GPC average molecular weight of about 7500.

EXAMPLE 15

In a similar manner to Example 14, a mixture of about 31.75 grams of a hydrosiloxane polymer having an average molecular weight of about 1012 and the average formula Me₃SiO(Me₂SiO)₅(MeHSiO)₈SiMe₃

(Anal: Si—H, 176.3 cc. H₂/gram; Calc: 0.2501 mole MeHSiO), about 143.75 grams of the acrylonitrile-capped polyoxyalkylene product of Example 7 having the average formula

H₂C=CHCH₂O(C₂H₄O)₇.₉CH₂CH₂CN (about 25% excess of theory) and about 175.5 grams of toluene was heated to about 90° C with stirring. The reaction mixture is then catalyzed with about 20 parts per million of platinum as chloroplatinic acid catalyst and the reaction conducted at 90° C to 110° C for 2½ hours. Additional platinum catalyst, about 20 ppm platinum after ¼ hour, about 10 ppm platinum after ½ hour and about 10 ppm platinum after 1 hour was added during the reaction. After said 2½ hours the reaction mixture was analyzed for residual Si—H and yielded 1.0 ccH$_2$/4.0cc, sample, indicating that the reaction had gone to 98.5 percent completion. The reaction product was cooled to room temperature, neutralized with NaHCO$_3$ and filtered. The filtrate was then desolvated by rotary evaporation at 90° C/< 0.5 mm Hg. The desired acrylonitrile-capped polyoxyalkylene-polysiloxane product was a clear dark brown liquid having the average formula

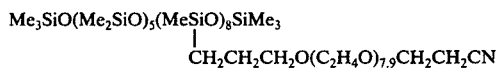

This siloxane product designated herein as Surfactant E, had a Brookfield viscosity (at room temperature) of about 496 centipoises and a GPC average molecular weight of about 4700.

EXAMPLE 16

In a similar manner to Example 15, a mixture of about 35.0 grams of a hydrosiloxane polymer having an average molecular weight of about 892 and the average formula

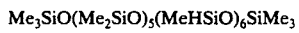

(Anal: SiH, 153.6 ccH$_2$/gram; Calc: 0.240 mole MeHSiO), about 138.0 grams (0.3 mole) of the acrylonitrile-capped polyoxyalkyene product of Example 7 having the average formula

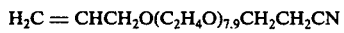

(about 25% excess of theory) and about 173.0 grams of toluene was heated to about 90° C with stirring. The reaction mixture was then catalyzed with about 30 parts per million of platinum as chloroplatinic acid catalyst and the reaction conducted at 90° C to 109° C for 1½ hours. The reaction mixture was then analyzed for residual Si—H and yielded 0.75 cc H$_2$/4.0 cc sample, indicating that the reaction had gone to 98.8 percent completion. The reaction product was cooled to room temperature, neutralized with NaHCO$_3$ and filtered. The filtrate was then desolvated by rotary evaporation at 90° C/<0.5 mm Hg. The desired acrylonitrile-capped polyoxyalkylene-polysiloxane product was a clear brown liquid having the average formula

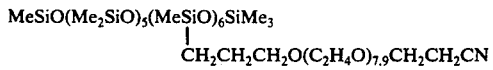

The siloxane product, desigmted herein as Surfactant F, had a Brookfield viscosity (at room temperature) of about 335 and a GPC average molecular weight of about 3900.

EXAMPLE 17

In a manner similar to Example 16, a mixture of about 27.9 grams of a hydrosiloxane polymer having an average molecular weight of about 1,132 and the average formula

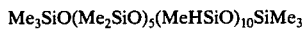

(Anal: Si—H, 205.0 cc H$_2$/gram; Calc; 0.2555 mole MeHSiO), about 146.6 grams of the acrylonitrile-capped polyoxyalkylene product of Example 7 having the average formula

(about 25% excess of theory) and about 174.5 grams of toluene was heated to about 90° C with stirring. The reaction mixture was then catalyzed with about 30 parts per million of platinum as chloroplatinic acid catalyst and the reaction conducted at 90° C to 109° C. for 3½ hours. Additional platinum catalyst, about 10 ppm platinum after 1/6 hour and about 10 ppm platinum after 1 hour was added during the reaction. After said 3½ hours the reaction mixture was analyzed for residual Si—H and yielded 0.75 cc H$_2$/4.0 cc sample, indicating that the reaction had gone to 98.9 percent completion. The reaction product was cooled, neutralized with NaHCO$_3$ and filtered. The filtrate was then desolvated by rotary evaporation at 90° C/< 0.5 mm Hg. The desired acrylonitrile-capped polyoxyalkylene-polysiloxane product was a clear light brown liquid having the average formula

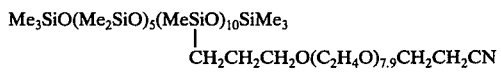

This siloxane product, designated herein as Surfactant G, had a Brookfield viscosity (at room temperature) of about 478 and a GPC average molecular weight of about 4700.

EXAMPLE 18

In a manner similar to Example 11, a mixture of about 10.4 grams of a hydrosiloxane polymer having an average molecular weight of about 416 and the average formula

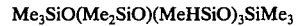

(Anal: Si—H, 161.3 cc H$_2$)gram; Calc: 0.07498 mole MeHSiO) and about 42.2 grams of the acrylonitrile-capped polyoxyalkylene product of Example 1 having the average formula

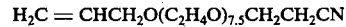

(about 28% excess of theory) and about 30 ml. of xylene was heated at 45° C with constant stirring. At that temperature about 50 parts per million of platinum as chloroplatinic acid catalyst was added to the system. There was an exothermal reaction noted. The reaction mixture was maintained at 85° C–95° C for 1 hour until completed. The reaction mixture was then cooled, neutralized with NaHCO$_3$, filtered and the filtrate desolvated by rotary evaporation at 50° C/5 mm Hg. about 50.1 grams of the desired acrylonitrile-capped polyoxyalkylene-polysiloxane product having the average formula

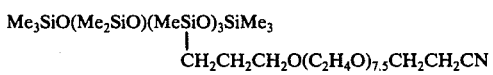

was obtained. Said siloxane product is designated herein as Surfactant H.

EXAMPLES 19–32

In these examples, flexible polyester polyurethane foam containing a flame-retarding agent were produced using the above-described Surfactants A through H of this invention (and with the above-described Control Surfactants AA, BB and CC, not of this invention) as the respective foam stabilizing surfactant component of the foam-producing reaction mixture, designated herein as Foam Formulation A, which has the composition given in Table I, which follows.

a double three-bladed marine-type propeller about 3 inches in diameter. The mixing in the drill press was accomplished at 1000 revolutions per minute for 8 seconds. Then the premixture of surfactant, catalyst and water was added and mixing was continued for 7 additional seconds. The reaction mixture was poured into a 12 in. × 12 in. × 12 in. cardboard box, was allowed to rise and was then cured for about 30 minutes at 130° C. Samples of the foam products prepared for breathability and for a determination of burning resistance (burning extent and flame rating) in accordance with ASTM D-1962-68 and the results are given in Table II which follows:

TABLE II

| Example Number | Surfactant | Parts by Weight | FOAM QUALITY | | | | FLAMMABILITY | |
|---|---|---|---|---|---|---|---|---|
| | | | Rise Inches | Breathability SCFM | Top Collapse (Inches) | Density lb/ft.$^3$ | Burning Extent(Inches) | Rating |
| 19 | A | 1 | 5.5 | 0.7 | 0.3 | 2.21 | 2.6 | SE |
| 20 | A | 0.5 | 5.2 | 1.4 | None | 2.11 | 1.6 | SE |
| 21 | B | 1.0 | — | 1.15 | 0.1 | 2.08 | 2.0 | SE |
| 22 | C | 1.0 | 5.2 | 1.2 | 0.3 | 2.15 | 2.0 | SE |
| 23 | C | 0.5 | 5.3 | 2.6 | 0.1 | 2.21 | 1.6 | SE |
| 24 | D | 0.5 | 5.2 | TIGHT | — | — | 1.9 | SE |
| 25 | E | 0.5 | 5.8 | 4.3 | NONE | 2.2 | 1.8 | SE |
| 26 | F | 0.5 | 5.2 | 6.0 | 0.2 | 1.96 | 3.4 | SE |
| 27 | G | 0.5 | 5.1 | 1.0 | NONE | 2.16 | 1.7 | SE |
| 28 | H | 1.0 | 5.4 | 1.4 | NONE | — | 1.7 | SE |
| 29 | H | 0.5 | 5.4 | TIGHT | — | — | — | — |
| 30 | AA+ | 1.0 | 5.6 | 2.0 | NONE | 2.01 | 2.2 | SE |
| 31 | BB+ | 0.5 | 5.0 | 5.8 | 0.4 | 2.03 | 2.7 | SE |
| 32 | CC+ | 1.0 | — | 1.15 | SLIGHT | 2.03 | 5 | B |

AA+, BB+, CC+ - Surfactants not of this invention

TABLE I

| FOAM FORMULATION A | |
|---|---|
| Component | Parts by Weight |
| Surfactant | Varied (0.5 to 1) |
| Polyester Polyol[1] | 100.0 |
| N-ethylmorpholine | 1.9 |
| Hexadecyldimethylamine | 0.3 |
| Water | 3.6 |
| Tolylene diisocyanate (Index 105)[2] | 45.2 |
| Tris(2-chloroethyl)phosphate | 7.0 |

[1]The polyester polyol employed was a commercially available polyester resin produced from adipic acid, diethylene glycol and trimethylol propane in a mole ratio of approximately 1:1:0.2. This polyester has a hydroxyl number of about 50 to 56, a molecular weight of about 2,000, an acid number not greater than 2 and a viscosity of about 17,000 centistokes at about 25° C. This particular polyester is known as "Witco Fomrez No. 50" (Witco Chemical Corporation).

[2]This component was a mixture of 2,4-tolylene diisocyanate (80 weight percent) and 2,6-tolylene diisocyanate. Index 105 means that the amount of mixture employed was 105 percent of the stoichiometric amount required to react with the polyester polyol and water present in the foam formulation.

The runs of Examples 19–32 were carried out in accordance with substantially the same general procedure which entailed the following steps. The surfactant, amine catalysts and water were premixed in a 50 milliliter beaker. The polyester polyol reactant was weighted into a tared 32-ounce capacity container. The flame-retardant [tris(2-chloroethyl)phosphate] and tolylene diisocyanate reactant were also weighed into the container and mixed with a spatula until homogeneous. Further mixing was done on a drill press equipped with The data in Table II above demonstrates that the acrylonitrile-capped polyoxyalkylene-polysiloxane surfactant polymers of this invention are effective stabilizers of flexible polyester foam and possess the further desirable property of allowing for the formation of flexible polyester foam containing a flame retardant which foam has a self-extinguishing flammability rating as tested above.

EXAMPLES 33–36

In accordance with these examples, a repeated preparative example of Surfactant E, herein designated Surfactant E', was blended with various organic compounds to provide illustrative solution compositions of this invention. These blended compositions are designated herein as Blended Surfactants I through L and each was used as the surfactant component of Foam Formulation A above in a concentration of one part by weight, following the general procedure described above with reference to Examples 19–32. In using the blended surfactants, clear, homogeneous aqueous premixtures were obtained when the water and amine catalysts of Foam Formulation A were combined therewith. The composition of the blended surfactants and the results of these examples are given in the following Table III.

TABLE III

| Example Number | SURFACTANT COMPOSITION | | | Breathability SCMF | Density Lb/Ft$^3$ | Burning Extent (Inches) | Flamability Rating |
|---|---|---|---|---|---|---|---|
| | Blended Surfactant | Components | Wt. % of Components | | | | |
| 33 | I | Surfactant E' | 35 | 0.8 | 2.18 | 1.9 | SE |
| | | Nonionic [1] | 28 | | | | |
| | | Tall Oil | 20 | | | | |
| | | Hexylene Glycol | 15 | | | | |
| | | Water | 2 | | | | |
| 34 | J | Surfactant E' | 50 | 3.0 | 2.06 | 3.23 | SE |
| | | Nonionic [1] | 8 | | | | |
| | | Tall Oil | 20 | | | | |
| | | Hexylene Glycol | 20 | | | | |
| | | Water | 2 | | | | |

TABLE III-continued

| Example Number | Blended Surfactant | SURFACTANT COMPOSITION Components | Wt. % of Components | Breathability SCMF | Density Lb/Ft$^3$ | Burning Extent (Inches) | Flamability Rating |
| --- | --- | --- | --- | --- | --- | --- | --- |
| 35 | K | Surfactant E' | 50 | 2.9 | 2.09 | 2.9 | SE |
|    |   | Nonionic [1] | 13 | | | | |
|    |   | Tall Oil | 20 | | | | |
|    |   | Hexylene Glycol | 15 | | | | |
|    |   | Water | 2 | | | | |
| 36 | L | Surfactant E' | 35 | 2.5 | 2.06 | 2.38 | SE |
|    |   | Anionic [2] | 35 | | | | |
|    |   | Tall Oil | 20 | | | | |
|    |   | Hexylene Glycol | 10 | | | | |

[1] An organic nonionic surfactant in which the hydrophobe is a mixture of $C_{11}$–$C_{15}$ alcohols and the hydrophile is ethylene oxide (avg. 9 mols/mol of hydrophobe).

[2] An organic anionic surfactant which is a sodium sulfonate of a petroleum mixture and which is the same as defined in Surfactant CC above.

The data in Table III demonstrates that solution compositions of the arylonitrile-capped polyoxyalkylene-polysiloxane polymers of this invention in addition to forming clear homogeneous premixtures with water and amine catalysts, also possess good potency as effective stabilizers of flexible foam and further possess the desirable property of allowing for the formation of said foam containing a flame-retardant which foam has a self-extinquishing flammability rating as tested above.

EXAMPLES 37–40

In these examples a potency determination was made of above-described Surfactants A and C of this invention (and above-described Control Surfactants AA and DD, not of this invention) as the foam stabilizing surfactant in the production of flexible polyester polyurethane foam using Foam Formulation B as identified in Table IV, which follows:

TABLE IV

| FOAM FORMULATION B | |
| --- | --- |
| Component | Parts by Weight |
| Surfactant (varied) | Varied (0.5 to 1) |
| Polyester Polyol[1] | 100 |
| N-ethylmorpholine | 1.9 |
| Hexadecyldimethylamine | 0.3 |
| Water | 5.0 |
| Tolylene Diisocyanate (Index 105)[2] | 59.4 |

[1] As identified in footnote [1] of Table I
[2] As indicated in footnote [2] of Table I As indicated, Foam Formulation B contains 5 parts by weight of water per 100 l parts by weight of polyol reactant. The 5 parts water system is usually more difficult to stabilize than the more conventional formulations containing less water and thus provides a relatively sensitive test of potency. The foams were prepared following the above-described foaming procedure except that no flame-retardant was used. The results are given in Table V which follows.

TABLE V

| Example Number | Surfactant | Parts by Weight | Rise Inches | Cells per Inch | Cell Structure |
| --- | --- | --- | --- | --- | --- |
| 37 | A | 0.5 | 8.2 | 10–15 | COARSE |
| 38 | C | 0.5 | 8.1 | 10–15 | COARSE |
| 39 | AA+ | 1.0 | 8.1 | 10 | COARSE |
| 40 | DD+ | 0.5 | 7.9 | 10 | COARSE |

AA+ and DD+ - Surfactants not of this invention

The data of Table V demonstrates that the acrylonitrile-capped polyoxyalkylene-polysiloxane surfactants of this invention have excellent potency as reflected by the rise values of the flexible polyester foam products which do not contain a flame-retardant.

EXAMPLES 41–43

In accordance with these examples, 3-cyanopropyl-substituted polymethylpolysiloxane hydride fluids, designated in the examples as Si—H Internediate Fluids I–III were prepared having the average composition formula

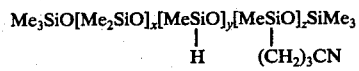

$$Me_3SiO[Me_2SiO]_x[MeSiO]_y[MeSiO]_zSiMe_3$$
$$\qquad\qquad\qquad\quad | \qquad\quad |$$
$$\qquad\qquad\qquad\quad H \quad (CH_2)_3CN$$

wherein the particular values of $x$, $y$ and $z$ are given in Table VI below. The respective fluids were prepared by the acid-catalyzed equilibration of reactants (1)–(4) listed below employing trifluoromethylsulfonic acid.

Reactant (1): Hexamethyldisiloxane, $Me_3SiOSiMe_3$, as the source of the endblocking trimethylsiloxy units, $Me_3SiO_{1/2}$—.

Reactant (2): Cyclic polymers of dimethylsiloxane distilled to provide the cyclic tetramer, $[Me_2SiO]_4$, as the predominant component (boiling point, 175° C./760 mm Hg.), as the source of the dimethylsiloxy units.

Reactant (3): Cyclic 3-cyanopropylmethylsiloxane polymer, as the source of the 3-cyanopropylmethyl-siloxy units. This reaction is prepared by the hydrolysis of 3-cyanopropylmethyldichlorosilane, $MeSiCl_2(CH_2)_3CN$, at a temperature of about 10°–15° C. and subatmospheric pressure (40–110 mm.) employing toluene diluent and neutralizing the hydrolyzate with sodium bicarbonate, followed by dehydration and cyclization of the hydrolyzate in the presence of sodium bicarbonate at reflux temperature, and removal of toluene from the cyclizate.

Reactant (4): Polymeric methylhydrogensiloxane (Si—H analysis, 355–365 cc. $H_2$ per gram), as the source of the methylhydrogensiloxy units.

The respective amounts of the aforesaid reactants (1)–(4) and catalyst employed in providing an analytical data pertaining to the respective reaction products are given in Table VI; the procedure and reaction conditions employed are as typically illustrated by the following detailed description of the preparation of Intermediate Fluid I.

Preparation of Intermediate Fluid I

The aforesaid Reactants (1)–(4) were charged in the following amounts to a 500 ml. capacity, three-necked flask equipped with a thermometer, mechanical, stirrer, condenser and nitrogen blow-by:

Reactant (1): 16.2 grams, corresponding to 0.1 mole of $Me_3SiOSiMe_3$ or 0.2 mole-equivalents of $Me_3SiO_{1/2}$;

Reactant (2): 44.5 grams, corresponding to 0.6 mole-equivalent ($x'$) of the unit, $Me_2SiO_{2/2}$;

Reactant (3): 101.78 grams, corresponding to 0.8 mole-equivalent ($z'$) of the unit, $NC(CH_2)_3Si(Me)O_{2/2}$; and Reactant (4): 36.0 grams, corresponding to 0.6 mole-equivalent ($y'$) of the unit, $MeHSiO_{2/2}$.

Also added was 0.8 gram of anhydrous trifluoromethyl sulfonic acid catalyst corresponding to about 0.4 weight percent of the total weight of reactants. The heterogeneous reaction mixture was stirred at room temperature overnight (about 18 hours). The clear liquid equilibrate was neutralized with sodium bicarbonate while stirring for about 1 hour, and filtered. The liquid product had a viscosity of 116 centipoise. Based upon the method and proportions of reactants employed expressed on the normalized basis of two moles of M units, the fluid product, designated Si—H Intermediate Fluid I, has the average composition:

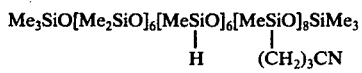

corresponding to a theoretical MeHSiO content of 18.1 weight percent. Upon Si—H analysis, the product provided 64.0 cc. $H_2$/gram on the basis of which the found MeHSiO content is 17.4 weight percent.

As used herein, the weight percentages expressed as "% MeHSiO, Found" are derived from the Si—H Analysis (cc. $H_2$ per gram) in accordance with the conversion:

Weight Percent MeHSiO Found = cc $H_2$ per gram × 100/373.3 where the factor 373.3 is the theoretical number of cubic centimeters of hydrogen provided per gram of fluid consisting of 100 percent MeHSiO (that is, 22,400 cc. of hydrogen divided by the unit molecular weight of 60). The weight percentages expressed as "%MeHSiO, Theoretical" correspond to the weight (60 y) contributed by MeHSiO divided by the calculated molecular weight of the fluid product times 100.

The above data pertaining to Si—H Intermediate Fluid I, as well as corresponding data for Si—H Fluids II and III are given in Table VI which follows.

TABLE VI

Preparation of Si-H Intermediate Fluids, where the average values of x, y and z are given below.

| EXAMPLE NUMBER | | 41 | 42 | 43 |
|---|---|---|---|---|
| Si-H Intermediate Fluid | | I | II | III |
| REACTANTS | | | | |
| $Me_3SiOSiMe_3$: | grams | 16.2 | 16.2 | 16.2 |
| | moles /1/ | 0.1 | 0.1 | 0.1 |
| $Me_2SiO_{2/2}$: | grams /2/ | 44.5 | 44.5 | 74.15 |
| | mole-eq. ($x'$) | 0.6 | 0.6 | 1.0 |
| $(CH_2)_3Si(Me)O_{2/2}$: | grams /3/ | 101.7 | 50.9 | 50.9 |
| | mole-eq. ($z'$) | 0.8 | 0.4 | 0.4 |
| $Me(H)SiO_{2/2}$: | grams /4/ | 36 | 36 | 36 |
| | mole-eq. ($y'$) | 0.6 | 0.6 | 0.6 |
| CATALYST | | | | |
| $CF_3SO_3H$, wt. % | | 0.4 | 0.8 | 0.4 |
| Si-H Fluid Product | | | | |
| Moles of Units /2Me$_3$SiO$_1$ | | | | |
| x (average) | | 6 | 6 | 10 |
| z (average) | | 8 | 4 | 4 |
| y (average) | | 6 | 6 | 6 |
| Si-H Analysis | | | | |
| cc. H/gram | | 64.0 | 84.0 | 74.4 |
| % Me(H)SiO: | Found /5/ | 17.4 | 22.5 | 19.9 |
| | Theo. | 18.1 | 24.4 | 20.3 |
| Viscosity, centipoise | | 116 | | 55 |

/1/ Corresponding to 0.2 moles (or mole-equivalents) of $Me_3SiO_{1/2}$.
/2/ Grams used of Reactant (2), corresponding to the indicated mole-equivalents of the unit, $Me_2SiO_{2/2}$.
/3/ Grams used of Reactant (3), corresponding to the indicated mole-equivalents of the unit $NC/CH_2)_3Si(Me)O_{2/2}$.
4/4 Grams used of Reactant (4), corresponding to the indicated mole-equivalents of the uint $Me(H)SiO_{1/2}$.
/5/ Corresponding to the cc. Hg/gram found.

EXAMPLE 44

In a manner similar to Example 8, the acrylonitrile-capped polyoxyalkylene composition product having the average formula

$H_2C = CHCH_2O(C_2H_4O)_{7.5}CH_2CH_2CN$ was prepared using about 4000 grams of $H_2C = CHCH_2O(C_2H_4O)_{7.5}H$; about 800 grams of toluene; about 24 grams of 10 wt. % aqueous $Me_4NOH$ and about 572 grams of acrylonitrile. The reaction was conducted by adding the acrylonitrile dropwise to the reaction mixture over 40 minutes while the reaction temperature was maintained with an ice bath at about 18° C. After all of the acrylonitrile had been added and the exothermic reaction completed the reaction mixture was then warmed to room temperature and allowed to sit for 2 hours and then was neutralized with about 12 grams of 85 wt. % aqueous $H_3PO_4$. About 200 grams of Magnesol was added to the neutralized mixture and the mixture allowed to stand over night. The reaction mixture was then filtered and the filtrate desolvated. Analysis of the desired polyether product showed aout 0.27 wt. % residual hydroxyl groups and that about 93 percent of the starting polyether was cyanoethylated.

EXAMPLE 45

Into a 500 ml., 3-necked flask equipped with a mechanical stirrer, thermometer and $N_2$ cover was charged about 39.7 grams (0.12 mole) of the hydrosiloxane polymer product of Example 41 having the average formula

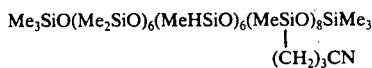

(Si—H Intermediate Fluid I), about 70.8 grams (0.156 mole) of the acrylonitrile-capped polyoxyalkylene product of Example 44 having the average formula $$H_2C = CHCH_2O(C_2H_4O)_{7.5}CH_2CH_2CN$$

(about 30% excess of theory); and about 100 ml. of toluene. The reaction mixture was heated to about 85° C. at which time 50 parts per million of platinum as chloroplatinic acid catalyst (about 0.0005 gram) was added. The reaction exothermed to 103° C. and was stirred over night as it cooled to room temperature. The reaction mixture was analyzed for residual Si—H and yielded 0.0 cc $H_2$/2 ml. aliquot, indicating that the reaction had gone to completion. The reaction mixture was then neutralized by adding about 2 grams of $NaHCO_3$ and 1 gram of ATTACOTE and stirring for 1 hour. The neutralized reaction mixture was then filtered and the filtrate desolvated by rotary evaporation at 50° C/1 mm Hg. The desired acrylonitrile-capped polyoxyalkylene-polysiloxane product was a liquid having the average formula

The siloxane product, designated herein as Surfactant M, had a Brookfield viscosity (at room temperatue) of about 400 centipoises and a GPC average molecular weight of about 4,600.

EXAMPLE 46

Into a 500 ml., 3-necked flask equipped with a mechanical stirrer, thermometer and $N_2$ cover was charged about 29.5 grams (0.12 mole) of the hydrosiloxane polymer product of Example 42 having the average formula

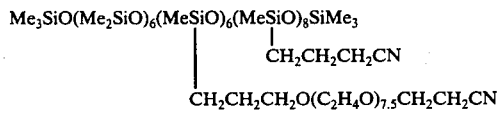

(Si—H Intermediate Fluid II); about 70.8 grams (0.156 mole) of the acrylonitrile-capped polyoxyalkylene product of Example 44 having the average formula $$H_2C = CHCH_2O(C_2H_4O)_{7.5}CH_2CH_2CN$$

(about 30% excess of theory); and about 100 ml. of toluene. The reaction mixture was heated to about 85° C at which time 50 parts per million of platinum as chloroplatinic acid catalyst (about 0.0005 gram) was added. The reaction exothermed to 100° C. and was stirred overnight as it cooled to room temperature. Analysis of the reaction mixture indicated that the reaction had gone to completion. The reaction mixture was then neutralized by adding about 2 grams of $NaHCO_3$ and 1 gram of ATTACOTE and stirring for 1 hour. The neutralized reaction mixture was then filtered and the filtrate desolvated by rotary evaporation at 50° C/1 mm Hg. The desired acrylonitrile-capped polyoxyalkylene-polysiloxane product was a liquid having the average formula

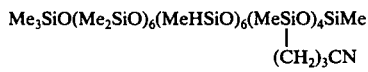

The siloxane product, designated herein as Surfactant N, had a Brookfield viscosity (at room temperature) of about 175 centipoises and a GPC average molecular weight of about 3,300.

EXAMPLE 47

Into a 500 ml., 3-necked flask equipped with a mechanical stirrer, thermometer and $N_2$ cover was charged about 35.4 grams (0.12 mole) of the hydrosiloxane polymer product of Example 43 having the average formula

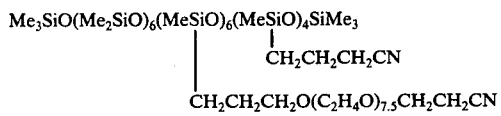

(Si—H Intermediate Fluid III), about 70.8 grams (0.156 mole) of the acrylonitrile-capped polyoxyalkylene product of Example 44 having the average formula $$H_2C = CHCH_2O(C_2H_4O)_{7.5} CH_2CH_2CN$$

(about 30% excess of theory); and about 105 ml. of toluene. The reaction mixture was heated to about 85° C at which time 50 parts per million of platinum as chloroplatinic acid catalyst (about 0.0005 gram) was added. The reaction exothermed and was stirred over night as it cooled to room temperature. Analysis of the reaction mixture indicated that the reaction had gone to completion. The reaction mixture was then neutralized by adding about 2 grams of $NaHCO_3$ and 1 gram of ATTACOTE and stirring for 1 hour. The neutralized reaction mixture was then filtered and the filtrate desolvated by rotary evaporation at 50° C/5mm Hg. The desired acrylonitrile-capped polyoxyalkylene-polysiloxane product was a liquid having the average formula

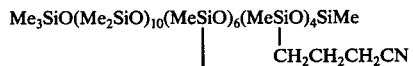

The siloxane product, designated herein as Surfactant 0, had a Brookfield viscosity (at room temperature) of about 505 centipoises and a GPC average molecular weight of about 5,200.

EXAMPLES 48—51

In these examples, flexible polyester polyurethane foam containing a flame retardant were produced using the above described Surfactants M through O of this invention (and the above described Control Surfactant AA) as the respective foam stabilizing surfactant component of the foam-producing reacton mixture. Said foam-producing reaction mixture was the same as Foam Formulation A described above and the foams were prepared and samples analyzed following the above described procedures. The results are given in Table VII which follows.

TABLE VII

| Example Number | Surfactant | Parts by Weight | Foam Quality | | | | Flamability | |
|---|---|---|---|---|---|---|---|---|
| | | | Rise Inches | Breathability SCFM | Cells per Inch | Density Lb/ft$^3$ | Burning Extent | Rating |
| 48 | M | 0.35 | 5.4 | 1.0 | 45/50 | 2.10 | 1.6 | 28.3 |
| 49 | N | 0.35 | 5.3 | 0.28 | 45/50 | 2.14 | 1.9 | 34.3 |
| 50 | O | 0.35 | 5.5 | 1.9 | 45/50 | 2.08 | 2.7 | 58.0 |
| 51 | AA+ | 1.0 | 6.5 | 1.6 | 55/60 | 1.85 | 3.5 | 79 |

AA+ - Surfactant not of this invention

The data in Table VII above demonstrates that the acrylonitrile-capped polyoxyalkylene-polysiloxane polymers of this invention are effective stabilizers for flexible polyester polyurethane foam that contain a flame-retardant.

EXAMPLES 52-54

In these examples, flexible polyester polyurethane foam, not containing a flame-retardant, were produced using the above described Surfactants M and N of this invention (and the above described Control Surfactant AA) as the respective foam stabilizing surfactant component of the foam-producing reaction mixture. Said foam-producing reaction mixture was the same as Foam Formulation B described above and the foams were prepared and samples analyzed following the above described procedures except no flame-retardant was used. The results are given in Table VIII which follows:

TABLE VIII

| Example Number | Surfactant | Parts by Weight | Foam Quality | | | |
|---|---|---|---|---|---|---|
| | | | Rise Inches | Breathability SCFM | Cells per Inch | Density Lb./ft. |
| 52 | M | 0.35 | 8.3 | 0.5 | 30/35 | 1.47 |
| 53 | N | 0.35 | 8.4 | 1.9 | 30/35 | 1.47 |
| 54 | AA+ | 1.0 | 8.5 | 2.5 | 40/45 | 1.47 |

AA+ - Surfactant not of this invention

The data in Table VIII above demonstrates that the acrylonitrile-capped polyoxyalkylene-polysiloxane polymers of this invention are effective stabilizers for flexible polyester polyurethane foam that does not contain a flame-retardant.

EXAMPLE 55

An acrylonitrile-capped polyoxyalkylene composition was prepared in a similar manner as described above by reacting a mixture of about 350 lbs. of a polyether having an average molecular weight of about 390 (allyl analysis) and the average composition formula $H_2C=CHCH_2O(C_2H_4O)_{7.5}H$ and about 52.2 lbs. of acrylonitrile (5% excess of theory) along with about 135 grams of 10% aqueous $H_3PO_4$. The reaction was conducted at 26° C to 32° C over 3½ hours. Then about 20 lbs. of benzene was added, the reaction mixture vacuum stripped at about 75° C./62 mm Hg. and filtered to yield the desired allyl and acrylonitrile endblocked polyether having the average composition formula $$H_2C=CHCH_2O(C_2H_4O)_{7.5}CH_2CH_2CN$$

(anal. 9.04% allyl).

An acrylonitrile-polysiloxane polymer was then prepared in a similar manner as described above using about 197 lbs. of the above allyl and arylonitrile endblocked polyether product, about 30 lbs. of isopropanol, about 14 gal. of toluene, about 40 lbs. of a hydrosiloxane polymer having the average composition formula $$Me_3SiO(Me_2SiO)_{5.2}(MeHSiO)_{7.6}SiMe_3$$

(Anal. Si—H, 178 ccH$_2$/gr.; Visc. 7.1 centistoke) and about 84 ml. of chloroplatinic acid catalyst (10% ethanol-1,2 dimethoxy-ethane solution). The reaction was conducted at about 95° C to 104° C for about 12 hours after which analysis of the reaction mixture for residual Si—H showed 1.4 ccH$_2$/gr. The reaction mixture was then sparged with ethylene for 1 hour and analysis yielded only a trace of Si—H indicating the reaction was essentially completed. The reaction mixture was then vacuum stripped at about 29° C./80–120 mm Hg. to remove the toluene and isopropanol, cooled and filtered. The desired acrylonitrile-capped polyoxyalkylene-polysiloxane product was an amber liquid having the average composition formula $$Me_3SiO(Me_2SiO)_{5.2}(MeSiO)_{7.6}SiMe_3$$
$$|$$
$$CH_2CH_2CH_2O(C_2H_4O)_{7.5}CH_2CH_2CN$$

This siloxane product, designated herein as Surfactant P, had a Brookfield viscosity (at 25° C) of about 372 and a specific gravity of 1.089. Analysis also showed 6.4%CN, 2% allyl and 0.53% OH.

EXAMPLES 56-57

In accordance with these examples above described Surfactant P was blended with various organic compounds to provide illustrative solution compositions of this invention. These blended compositions are designated herein as Blended Surfactants Q and R. The solution composition of said blended surfactants is given in Table IX which is as follows:

TABLE IX

| Example Number | Blended Surfactant | Components | Wt. % of Components* |
|---|---|---|---|
| 56 | Q | Surfacatnt P | 35 |
| | | Anionic/1/ | 35 |
| | | Tall Oil | 15 |
| | | Hexylene Glycol | 15 |
| 57 | R | Surfacant P | 52 |
| | | Nonionic/2/ | 10.4 |
| | | Tall Oil | 15.6 |
| | | Hexylene Glycol | 21 |

*Ionol was also present in Blended Surfactants Q (10000 ppm) and R (1%).
/1/An organic anionic surfactant which is a sodium sulfonate of a hydrocarbon mixture available commercially as "Petronate L" (Witco Chemical Company).
/2/An organic nonionic surfactant in which the hydrophope is a mixture of $C_{11}$ to $C_{15}$ alcohols and the hydrophile is ethylene oxide (avg. 9 mols/mol of hydrophobe).

EXAMPLES 58 – 67

In accordance with these examples, a series of machine scale flexible polyester urethane foams were prepared employing above-described Blended Surfactants Q and R of this invention (and above described Control Surfactants AA and CC, not of this invention) as the foam stabilizing components of Foam Formulations C and D which contained 5.0 and 3.6 parts water per 100 parts of polyester polyol, respectively. The purpose of these examples was to determine whether the acrylonitrile-capped polyoxyalkylene-polysiloxane polymers of the invention as illustrated by Surfactant P contained in Blended Surfactants Q and R are capable of providing semicommercial size foam buns having acceptable physical properties. In these examples, a Hennecke UBT-63 high pressure continuous polyurethane foam machine was used to which the following three streams was added (1) the polyester polyol; (2) the activator stream containing water, amine catalysts and foam-stabilizing surfactants; and (3) the polyisocyanate reactant. The mixer speed was about 5000 revolutions per minute and the head pressure was 12–17 pounds per square inch. At ambient temperature the emerging foam mixture was poured onto paper on a continuously moving conveyor belt. The foams were allowed to set and cure in the form of large slabs (12 feet in length, 22 inches wide and 18 inches high). After 24 hours of aging at ambient temperatures the foams were cut and submitted for physical property measurements. In using Blended Surfactants Q and R, clear homogeneous aqueous premixtures were obtained when the water and amine catalysts of the foam formulations were combined therewith. The composition of Foam Formulations C and D, the amount of the blended surfactants employed in each example, and the results are given in Table X and XI which follow.

TABLE X

POLYESTER POLYOL-BASED FOAMS (Machine Runs)

| EXAMPLE No. | 58 | 59 | 60 | 61 | 62 | 63 | 64 |
|---|---|---|---|---|---|---|---|
| Foam Formulation C, Parts by Weight | | | | | | | |
| Polyester Polyol /1/ | 100 | 100 | 100 | 100 | 100 | 100 | 100 |
| Polyisocyanate /1/ (Index = 105) | 59.2 | 59.2 | 59.2 | 59.2 | 59.2 | 59.2 | 59.2 |
| Water | 5.0 | 5.0 | 5.0 | 5.0 | 5.0 | 5.0 | 5.0 |
| Total Blended Surfactant | 1.0 | 1.0 | 0.5 | 1.0 | 0.5 | 0.5 | 0.5 |
| Control AA/2/ | 1.0 | — | — | — | — | — | — |
| Control CC /2/ | — | 1.0 | 0.5 | — | — | — | — |
| Q/3/ | — | — | — | 0.50 | 0.25 | 0.375 | 0.125 |
| R/3/ | — | — | — | 0.50 | 0.25 | 0.125 | 0.375 |
| N-ethylmorpholine | 2.0 | 2.0 | 2.0 | 2.0 | 2.0 | 2.0 | 2.0 |
| Hexadecyldimethylamine | 0.3 | 0.3 | 0.3 | 0.3 | 0.3 | 0.3 | 0.3 |
| Cream Time, seconds | 3 | 3 | 3 | — | 3 | 3 | 3 |
| Rise Time, seconds | 46 | 47 | 45 | — | 44 | 46 | 47 |
| Gel Time, seconds | 80 | 81 | 81 | — | 83 | 82 | — |
| Foam Properties | | | | | | | |
| Foam Density, lbs./ft.$^3$ | 1.21 | 1.23 | S | 1.25 | 1.25 | 1.21 | 1.25 |
| Breathability, SCFM | 0.214 | 0.240 | P | 0.389 | 0.263 | 0.915 | 0.974 |
| ILD (4"), lbs./50 in.$^2$ | | | L | | | | |
| 25% | 50.7 | 56.9 | I | 51.0 | 48.2 | 50.1 | 48.3 |
| 65% | 96.0 | 125 | T | 27.4 | 25.0 | 24.9 | 26.2 |
| Compression Sets, % | | | S | | | | |
| 50% | 16.7 | 16.8 | | — | 14.6 | 12.6 | 14.7 |
| 75% | 26.5 | 50.0 | | — | 23.7 | 13.2 | 15.1 |
| 90% | 65.4 | 74.4 | | 15.5 | 61.6 | 18.6 | 25.7 |
| Tensile strength, p.s.i. | 26.9 | 24.8 | | 21.2 | 19.1 | 22.1 | 20.8 |
| Elongation, % | 236 | 256 | | 205 | 186 | 255 | 219 |
| Tear Resistance, lbs./in. | 3.19 | 3.86 | | 4.3 | 4.0 | 3.7 | 3.5 |
| CPI | 40–45 | 40–45 | | 40–45 | 40–45 | 40–45 | 40–45 |

/1/ As defined in Table I
/2/ AA and CC Surfactants not of this invention
/3/ As defined in Table IX

TABLE XI

POLYESTER POLYOL-BASED FOAMS (Machine Runs)

| EXAMPLE No. | 65 | 66 | 67 |
|---|---|---|---|
| Foam Formulation D, Parts by Weight | | | |
| Polyester Polyol /1/ | 100 | 100 | 100 |
| Polyisocyanate /1/ (Index = 105) | 45.2 | 45.2 | 45.2 |
| Water | 3.6 | 3.6 | 3.6 |
| Total Blended Surfactant | 1.0 | 2.0 | 1.0 |
| Control CC/2/ | 1.0 | — | — |
| Q/3/ | — | 1.0 | 0.5 |
| R/3/ | — | 1.0 | 0.5 |
| 3-Dimethylaminopropionitrile/Bis[2-(N,N-dimethylamino)ethyl]ether (95/5) | 2.0 | 2.0 | 2.0 |
| Hexadecyldimethylamine | 0.3 | 0.3 | 0.3 |
| Cream Time, seconds | 2.5 | 2.5 | 2.5 |
| Rise Time, seconds | 56 | 56 | — |
| Gel Time, seconds | 81 | 78 | — |
| Foam Properties | | | |
| Foam density, lbs./ft.$^3$ | 1.61 | 1.65 | 1.70 |
| Breathability, SCFM | 0.678 | 2.54 | 1.44 |
| ILD (4"), lbs./50 in.$^2$ | | | |
| 25% | 52.2 | 43.7 | 47.7 |
| 65% | 84.5 | 70.2 | 79.0 |
| 25% return | 28.9 | 24.8 | 28.0 |
| Compression Set, 90% | 8.5 | 8.4 | 10.8 |
| Tensile strength, p.s.i. | 22.2 | 23.6 | 24.8 |
| Elongation, % | 308 | 331 | 316 |
| Tear Resistance, lbs./in. | 3.5 | 3.9 | 3.7 |

1013051 and wherein the mole ratio of the SiO4/2 units to total Q substituted siloxy units to total trihydrocarbylsiloxy units is defined by j:k:p in which the ratio of j:k is from about 0.75:1 to about 2:1, and the ratio of p:k is from about 0.1:1 to about 1:1.

6. A polymer as defined in claim 3 wherein R is methyl, R" is —CH$_2$CH$_2$CH$_2$—, q, is 0, m has a value of 4 to 15, n is 0, a is 0, and b is 0 and c is 0.

7. A polymer as defined in claim 3 having the average composition formula

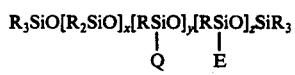

wherein E is a cyano-containing group having the formula —(O)$_r$R$^2$CN, wherein x has an average value of 0.5 to 20, y has an average value of 0.5 to 30 and z has an average value of 0.5 to 20.

8. A polymer as defined in claim 7 wherein x has an average value of 1 to 10, wherein y has an average value of 1 to 10, wherein z has an average value of 1 to 10, wherein r is 0, wherein R is methyl and wherein R$^2$ is an alkylene radical having from 2 to 4 carbon atoms.

9. A polymer as defined in claim 8 wherein R" and R$^2$ are —CH$_2$CH$_2$CH$_2$— wherein q is 0, m has a value of 4 to 15, and n is 0.

10. A polymer as defined in claim 7 having the average composition formula

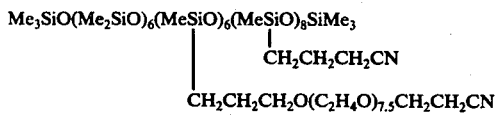

wherein Me is a methyl radical.

11. A polymer as defined in claim 7 having the average composition formula

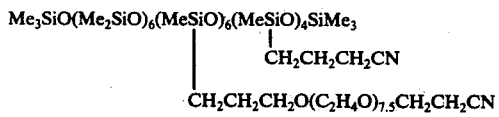

wherein Me is a methyl radical.

12. A polymer as defined in claim 7 having the average composition formula

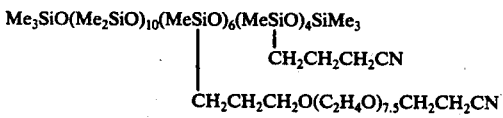

13. A polymer as defined in claim 3 having the average composition formula

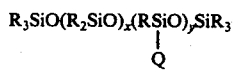

wherein x has an average value of 0.5 to 20 and y has an average value of 0.5 to 30.

14. A polymer as defined in claim 13 wherein x has an average value of 1 to 10 wherein y has an average value of 1 to 10 and R is a methyl radical.

15. A polymer as defined in claim 14 wherein R" is —CH$_2$CH$_2$CH$_2$—, wherein q is 0, m has a value of 4 to 15 and n is 0.

16. A polymer as defined in claim 13 having the average composition formula

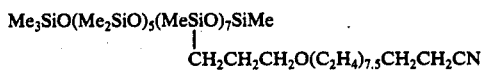

wherein Me is a methyl radical.

17. A polymer as defined in claim 13 having the average composition formula

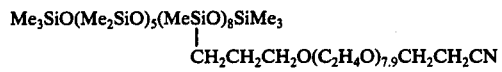

wherein Me is a methyl radical.

18. A polymer as defined in claim 13 having the average composition formula

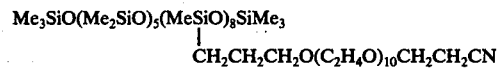

wherein Me is a methyl radical.

19. A polymer as defined in claim 13 having the average composition formula

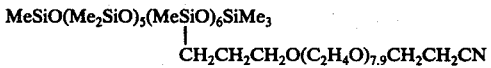

wherein Me is a methyl radical.

20. A polymer as defined in claim 13 having the average composition formula

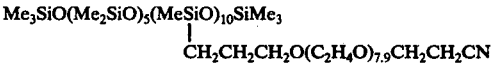

21. A polymer as defined in claim 13 having the average composition formula

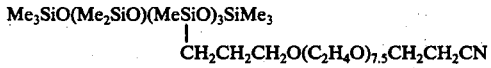

wherein Me is a methyl radical.

22. A polymer as defined in claim 13 having the average formula

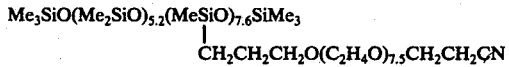

23. A process for producing polyurethane foam which comprises eimultaneously reacting and foaming a reaction mixture comprising (a) an organic polyol reactant containing an average of at least two hydroxyl groups per molecule; (b) an organic polyisocyanate reactant containing at least two isocyanato groups per molecule; (c) a blowing agent; (d) an amine catalyst and (e) a foam stabilizer comprising an acrylonitrile-capped polyoxyalkylene-polysiloxane polymer as defined in claim 1.

24. A process as defined in claim 23, in which said reaction mixture contains an organic flame-retardant as an additional component thereof.

25. A process for producing flexible polyester polyurethane foam which comprises simultaneously reacting and foaming a reaction mixture comprising (a) a polyester polyol reactant containing an average of at least two hydroxyl groups per molecule; (b) an organic polyisocyanate reactant containing at least two isocyanato groups per molecule; (c) water as a source of blowing action; (d) a tertiary amine catalyst; and (f) a foam stabilizer comprising an acrylonitrile-capped polyoxyalkylene-polysiloxane polymer as defined in claim 7.

26. A process as defined in claim 25 in which said reaction mixture contains an organic flame-retardant as an additional component thereof.

27. A process for producing flexible polyester polyurethane foam which comprises simultaneously reacting and foaming a reaction mixture comprising (a) a polyester polyol reactant containing an average of at least two hydroxyl groups per molecule; (b) an organic polyisocyanate reactant containing at least two isocyanato groups per molecule; (c) water as a source of blowing action; (d) a tertiary amine catalyst; and (f) a foam stabilizer comprising an acrylonitrile-capped polyoxyalkylene-polysiloxane polymer as defined in claim 13.

28. A process as defined in claim 27 in which said reaction mixture contains an organic flame-retardant as an additional component thereof.

29. A process for producing flexible polyester polyurethane foam which comprises simultaneously reacting and foaming a reaction mixture comprising (a) a polyester polyol reactant containing an average of at least two hydroxyl groups per molecule; and (b) an organic polyisocyanate reactant containing at least two isocyanato groups per molecule; (c) water as a source of blowing action; (d) a tertiary amine catalyst; and (f) a foam stabilizer comprising an acrylonitrile-capped polyoxyalkylene-polysiloxane polymer as defined in claim 14.

30. A process as defined in claim 29 in which said reaction mixture contains an organic flame-retardant as an additional component thereof.

31. A process for producing flexible polyester polyurethane foam which comprises simultaneously reacting and foaming a reaction mixture comprising (a) a polyester polyol reactant containing an average of at least two hydroxyl groups per molecule: (b) an organic polyisocyanate reactant containing at least two isocyanato groups per molecule; (c) water as a source of blowing action; (d) a tertiary amine catalyst; and (f) a foam stabilizer comprising an acrylonitrile-capped polyoxyalkylene-polysiloxane polymer as defined in claim 15.

32. A process as defined in claim 31 in which said reaction mixture contains an organic flame-retardant as an additional component thereof.

33. A polyurethane foam as produced by the process of claim 24.

34. A polyurethane foam as produced by the process of claim 26.

35. A polyurethane foam as produced by the process of claim 28.

36. A polyurethane foam as produced by the process of claim 30.

37. A polyurethane foam as produced by the process of claim 32.

* * * * *

UNITED STATES PATENT AND TRADEMARK OFFICE
CERTIFICATE OF CORRECTION

PATENT NO. : 4,043,951
DATED : August 23, 1977
INVENTOR(S) : Bela Prokai et al.

It is certified that error appears in the above-identified patent and that said Letters Patent are hereby corrected as shown below:

Column 1, line 20 change "polester" to --polyether--.

Column 9, line 31 change "1 to 4" to --2 to 4--.

Column 19, line 47 change "$C_1$-$C_{15}$" to --$C_{10}$-$C_{15}$--.

Column 21, line 62, change "1,12" to --1,2--.

Column 22, line 46 change "567" to --565--.

Column 22, line 58 change "$L'(NCO)_1$ to --$L'(NCO)_i$--.

Column 25, line 7 after "methods" insert --These various methods are known in the art.--

Column 25, line 64 correct the formula to read --$[(ClCH_2CH_2O)_3P(O)]$--.

Column 29, line 54 correct the formula to read --$Me_3SiO(Me_2SiO)_5(C_6H_5CH_2O(C_2H_4O)_{7.7}C_3H_6Si(Me)O)_8SiMe_3$--.

UNITED STATES PATENT AND TRADEMARK OFFICE
CERTIFICATE OF CORRECTION

PATENT NO. : 4,043,951
DATED : August 23, 1977
INVENTOR(S) : Bela Prokai et al.

It is certified that error appears in the above-identified patent and that said Letters Patent are hereby corrected as shown below:

Column 30, line 57 correct the formula to read --$CHCH_2O(C_2H_4O)_{7.9}H$--.

Column 32, line 57 change "$Me_4NON$" to --$Me_4NOH$--.

Column 34, line 62 change "4,000" to --4,400--.

Column 35 line 50 correct that portion of the formula shown as "$(C_2H_4O_410)_{7.9}$" to read --$(C_2H_4O)_{7.9}$--.

Column 44 in TABLE VI insert the omitted "Viscosity" value --36-- for "Example Number 42".

Column 54, in line 3 of claim 19 correct the start of the formula shown as "MeSiO" to read --$Me_3SiO$--.

Signed and Sealed this

*Twenty-sixth* Day of *June 1979*

[SEAL]

Attest:

RUTH C. MASON
*Attesting Officer*

DONALD W. BANNER
*Commissioner of Patents and Trademarks*